United States Patent
Imai

(10) Patent No.: US 8,355,574 B2
(45) Date of Patent: *Jan. 15, 2013

(54) DETERMINATION OF MAIN OBJECT ON IMAGE AND IMPROVEMENT OF IMAGE QUALITY ACCORDING TO MAIN OBJECT

(75) Inventor: Toshie Imai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 74 days.

This patent is subject to a terminal disclaimer.

(21) Appl. No.: 12/590,586

(22) Filed: Nov. 10, 2009

(65) Prior Publication Data

US 2010/0061627 A1   Mar. 11, 2010

Related U.S. Application Data

(63) Continuation of application No. 11/075,380, filed on Mar. 7, 2005, now Pat. No. 7,668,365.

(30) Foreign Application Priority Data

| Mar. 8, 2004 | (JP) | 2004-63630 |
| Mar. 8, 2004 | (JP) | 2004-63637 |
| Jun. 21, 2004 | (JP) | 2004-182016 |
| Feb. 15, 2005 | (JP) | 2005-38009 |

(51) Int. Cl.
*G06K 9/00* (2006.01)

(52) U.S. Cl. ......... 382/167; 382/274; 382/291

(58) Field of Classification Search ......... 382/118, 382/165, 167, 274, 286, 291
See application file for complete search history.

(56) References Cited

U.S. PATENT DOCUMENTS 6,021,221 A   2/2000   Takaha
(Continued)

FOREIGN PATENT DOCUMENTS

JP   11-167634   6/1999
(Continued)

OTHER PUBLICATIONS

Abstract of Japanese Patent Publication No. 2003-248825, Pub. Date: Sep. 5, 2003, Patent Abstracts of Japan.

(Continued)

*Primary Examiner* — Phuoc Tran
(74) *Attorney, Agent, or Firm* — Martine Penilla Group, LLP

(57) ABSTRACT

A CPU 411 splits selected image data GD into a plurality of areas (pixel data groups), analyzing the image data GD in terms of area units, and determining the color range of the areas of the image data GD. The CPU 411 determines color range areas by associating adjacent areas of the same color range when determining the color range for the areas of the image data GD. The CPU 411 acquires position data for the color range areas that have been determined. The CPU 411 acquires position conditions (main object conditions) from ROM/HDD 413, and narrows the main object candidates to "sky, green, or people." The CPU 411 finally determines the main object by comparing the position data of the color range color areas and the position conditions corresponding to the narrowed main object.

12 Claims, 18 Drawing Sheets

U.S. PATENT DOCUMENTS

| | | | |
|---|---|---|---|
| 6,301,440 B1 * | 10/2001 | Bolle et al. | 396/128 |
| 6,564,851 B1 | 5/2003 | Liao | |
| 6,947,078 B1 | 9/2005 | Kuwata et al. | |
| 6,975,437 B2 | 12/2005 | Takemoto | |
| 6,989,914 B2 | 1/2006 | Iwaki | |
| 7,016,075 B1 | 3/2006 | Tsukada | |
| 7,016,077 B2 | 3/2006 | Semba et al. | |
| 7,269,292 B2 | 9/2007 | Steinberg | |
| 2002/0150291 A1 | 10/2002 | Naf et al. | |
| 2003/0108250 A1 | 6/2003 | Luo et al. | |

FOREIGN PATENT DOCUMENTS

| | | |
|---|---|---|
| JP | 2002-016818 | 1/2000 |
| JP | 2000-270222 | 9/2000 |
| JP | 2000-278524 | 10/2000 |
| JP | 2001-092956 | 4/2001 |
| JP | 2001-160057 | 6/2001 |
| JP | 2001-169135 | 6/2001 |
| JP | 2001-218047 | 8/2001 |
| JP | 2001-358961 | 1/2002 |
| JP | 2002-279416 | 9/2002 |
| JP | 2003-087815 | 3/2003 |
| JP | 2003-198850 | 7/2003 |
| JP | 2003-248825 | 9/2003 |

OTHER PUBLICATIONS

Abstract of Japanese Patent Publication No. 2000-270222, Pub. Date: Sep. 29, 2000, Patent Abstracts of Japan.

Abstract of Japanese Patent Publication No. 2000-278524, Pub. Date: Oct. 6, 2000, Patent Abstracts of Japan.

Abstract of Japanese Patent Publication No. 2001-092956, Pub. Date: Sep. 27, 2002, Patent Abstracts of Japan.

Abstract of Japanese Patent Publication No. 2001-169135, Pub. Date: Jun. 22, 2001, Patent Abstracts of Japan.

Abstract of Japanese Patent Publication No. 2001-218047, Pub. Date: Aug. 10, 2001, Patent Abstracts of Japan.

Abstract of Japanese Patent Publication No. 2001-016818, Pub. Date: Jan. 18, 2002, Patent Abstracts of Japan.

Abstract of Japanese Patent Publication No. 2002-016818, Pub. Date: Jan. 18, 2002, Patent Abstracts of Japan.

Abstract of Japanese Patent Publication No. 2002-279416, Pub. Date: Sep. 27, 2002, Patent Abstracts of Japan.

Abstract of Japanese Patent Publication No. 2003-2198850, Pub. Date: Jul. 11, 2003, Patent Abstracts of Japan.

* cited by examiner

Fig.8

|   | S1 | S1 | S1 | S1 | S1 | S1 | S1 | S1 |
|---|----|----|----|----|----|----|----|----|
|   | S1 | S1 | S1 | S1 | S1 | S1 | S1 | S1 |
|   | O  | O  | O  | O  | O  | O  | O  | S1 (7,2) |
|   | S2 (0,3) | S2 | S2 | S2 | S2 | S2 | S2 | S2 (7,3) |
|   | O  | O  | O  | F1 | F1 | O  | O  | O  |
|   | O  | O  | S3 | S3 | S3 | R1 | O  | O  |
|   | O  | R1 | O  | S3 | S3 | O  | O  | O  |
|   | O  | O  | O  | O  | O  | O  | O  | O  |

Fig.9

|   | S1 | S1 | S1 | S1 | S1 | S1 | S1 | S1 |
|---|----|----|----|----|----|----|----|----|
|   | S1 | S1 | S1 | S1 | S1 | S1 | S1 | S1 |
|   | O  | O  | O  | O  | O  | O  | O  | S1 (7,2) |
|   | S1 (0,3) | S1 | S1 | S1 | S1 | S1 | S1 | S1 (7,3) |
|   | O  | O  | O  | F1 | F1 | O  | O  | O  |
|   | O  | O  | S3 | S3 | S3 | R1 | O  | O  |
|   | O  | R1 | O  | S3 | S3 | O  | O  | O  |
|   | O  | O  | O  | O  | O  | O  | O  | O  |

Fig.10

| HUE | DETERMINATION REFERENCE VALUE |
|---|---|
| SKY BLUE | Huref_sk |
| GREEN | Huref_gr |
| FLESH TONE | Huref_fl |
| RED | Huref_rd |

Fig.11

| OBJECT | HUE | POSITION | |
|---|---|---|---|
| SKY | SKY BLUE/ RED | TOP OF IMAGE AND TOUCHING EDGES OF IMAGE | AREA(x,0), (0,y), (7,y) $0 \leq x \leq 7, 0 \leq Y \leq 2$ |
| VEGETATION | GREEN | BOTTOM OF IMAGE AND TOUCHING EDGES OF IMAGE | AREA(x,7), (0,y), (7,y) $0 \leq x \leq 7, 4 \leq Y \leq 7$ |
| PEOPLE | FLESH TONE | MIDDLE OF IMAGE | AREA(x,y) $2 \leq x \leq 5, 2 \leq Y \leq 5$ |

Fig.15

| CLASSIFIED MAIN OBJECT | CLASSIFICATION COLOR VALUE | CORRECTION STANDARD LEVEL |
|---|---|---|
| BRIGHT SKY | Hcsb, Scsb, Bcsb | CONTRAST b, BRIGHTNESS b, COLOR BALANCE b |
| ORDINARY SKY | Hcsn, Scsn, Bcsn | CONTRAST n, BRIGHTNESS n, COLOR BALANCE n |
| DARK SKY | Hcsd, Scsd, Bcsd | CONTRAST d, BRIGHTNESS d, COLOR BALANCE d |

Fig.16

| CLASSIFIED MAIN OBJECT | STANDARD COLOR VALUE |
|---|---|
| BRIGHT SKY | Hrefsb, Srefsb, Brefsb |
| ORDINARY SKY | Hrefsn, Srefsn, Brefsn |
| DARK SKY | Hrefsd, Srefsd, Brefsd |

Fig.17

| CLASSIFIED MAIN OBJECT | CLASSIFICATION COLOR VALUE | STANDARD COLOR VALUE | COEFFICIENTS | | |
|---|---|---|---|---|---|
| | | | HUE | SATURATION | BRIGHTNESS |
| BRIGHT SKY | (Hcsb, Scsb, Vcsb) | (Hrefsb, Srefsb, Vrefsb) | (0,1) | (0,1) | (0,0) |
| MEDIUM SKY | (Hcsn, Scsn, Vcsn) | (Hrefsn, Srefsn, Vrefsn) | (1,1) | (1,1) | (0,0) |
| DARK SKY | (Hcsd, Scsd, Vcsd) | (Hrefsd, Srefsd, Vrefsd) | (2,0) | (2,0) | (0,0) |
| LIGHT GREEN | (Hcgb, Scgb, Vcgb) | (Hrefgb, Srefgb, Vrefgb) | (1,2) | (1,0) | (0,0) |
| MEDIUM GREEN | (Hcgn, Scgn, Vcgn) | (Hrefgn, Srefgn, Vrefgn) | (1,1) | (1,1) | (0,0) |
| DARK GREEN | (Hcgd, Scgd, Vcgd) | (Hrefgd, Srefgd, Vrefgd) | (4,1) | (4,0) | (0,0) |
| PALE PINK FLESH | (Hcfp, Scfp, Vcfp) | (Hreffp, Sreffp, Vreffp) | (0,1) | (0,1) | (1,0) |
| PALE YELLOW FLESH | (Hcfl, Scfl, Vcfl) | (Hreffl, Sreffl, Vreffl) | (1,1) | (1,1) | (1,0) |
| DARK YELLOW FLESH | (Hcfd, Scfd, Vcfd) | (Hreffd, Sreffd, Vreffd) | (1,1) | (1,0) | (1,1) |
| DARK BROWN FLESH | (Hcfb, Scfb, Vcfb) | (Hreffb, Sreffb, Vreffb) | (1,1) | (1,0) | (1,1) |

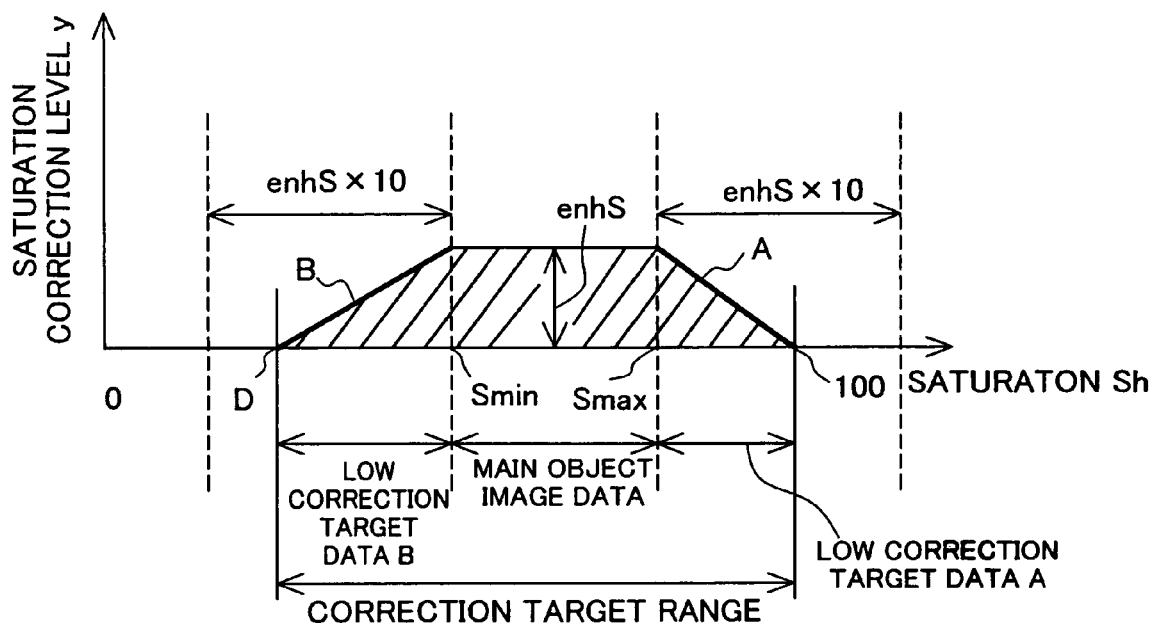

DETERMINATION OF MAIN OBJECT ON IMAGE AND IMPROVEMENT OF IMAGE QUALITY ACCORDING TO MAIN OBJECT

CROSS-REFERENCE TO RELATED APPLICATIONS

This application is a continuation of U.S. patent application Ser. No. 11/075,380, filed on Mar. 7, 2005, now U.S. Pat. No. 7,668,365 B2, the disclosure of which is hereby incorporated by reference in its entirety for all purposes.

BACKGROUND OF THE INVENTION

1. Field of the Invention

The invention relates to a technique that determines the main object characterizing an image, as well as a technique that adjusts the picture quality of the image data.

2. Description of the Related Art

The picture quality of digital image data produced by digital still cameras and the like can be adjusted as desired after photographs have been taken. Users can adjust picture quality using retouching software, for example. Meanwhile, because accurate adjustment of picture quality requires experience and familiarity, various techniques have been proposed for automatically adjusting picture quality using standard values without the need for user input.

However, in automatic picture quality adjusting techniques, picture quality is adjusted on the assumption that the main object characterizing the image has been correctly determined, and the erroneous determination of the main object can thus result in poor picture quality. It is therefore important to properly analyze the characteristics of the image data, such as determining what the main object characterizing the image is, in techniques for automatically adjusting picture quality of image data, and there is a need for a technique to accurately determine the main object.

Furthermore, in automatic picture quality adjusting techniques, such determinations are made across the board, without taking into consideration subtle differences in the main object characterizing the image, and a standardized picture quality adjusting process is carried out on the main object that has been determined. It is therefore inherently impossible to carry out a picture quality adjusting process that takes advantage of the subtle characteristics of the main object, and it is not always possible to output a more attractive main object. There is thus a need for a picture quality adjusting technique that is more responsive to variations in main objects.

SUMMARY OF THE INVENTION

In order to address the above problems, an object of the present invention is to properly identify the main object characterizing an image. It is also an object of the invention to improve the picture quality of the main object characterizing an image.

A first aspect of the invention for addressing at least some of the above problems provides an image processing device that determines the main object which characterizes an image. The image processing device in the first aspect of the invention comprises: image data acquiring module that acquires image data which is data of the target image and which is composed of a plurality of pixel data; color range determining module segmenting that segments the image data into a plurality of pixel data groups according to the plurality of areas into which the image is split, analyzing the image data in terms of pixel data units, and determining the color range exhibited by the pixel data groups; color range area defining module that defines color range areas by associating pixel data groups that exhibit the same color range and that are adjacent to each other among pixel data groups exhibiting specific color range; position data acquiring module that acquires position data for the color range areas; position condition acquiring module that acquires position conditions stipulating the position where an object that corresponds to the specific color range to be present; and main object determining module that determines the main object corresponding to the color range areas using the color range and position data of the color range areas as well as the position conditions.

The image processing device in the first aspect of the invention determines color range exhibited by the pixel data groups, forms color range areas by associating adjacent pixel data groups exhibiting the same color range among the pixel data groups exhibiting specific color range, and determines the main object corresponding to the color range areas using the color range and position data of the color range areas as well as the position conditions stipulating the position where an object that corresponds to the specific color range to be present. It is thus possible to properly identify the main object characterizing the image.

A second aspect of the invention provides an image processing device that determines the main object which characterizes an image. The image processing device in the second aspect of the invention comprises: image data acquiring module that acquires image data which is data of the target image; image data analyzing module that segments the image data into a plurality of areas for analysis in terms of area units; position data acquiring module that acquires position data of the areas of the image data; and determining module that determines the main object using the acquired position data and the results of analysis.

The image processing device in the second aspect of the invention determines the main object using the results of analysis and the position data of the areas of the acquired image data, thus allowing the main object characterizing the image to be properly identified.

A third aspect of the invention provides an image processing device that determines the main object which characterizes an image. The image processing device in the third aspect of the invention comprises: image data acquiring module that acquires image data which is data of the target image and which is composed of a plurality of pixel data; image data analyzing module that segments the image data into a plurality of pixel data groups according to the plurality of areas into which the image is split, and analyzing the image data in terms of pixel data units; position data acquiring module that acquires position data for the pixel data groups; and main object determining module that determines the main object using the acquired position data and results of analysis.

The image processing device in the third aspect of the invention determines the main object using the results of analysis and the position data of the acquired pixel data groups, thus allowing the main object characterizing the image to be properly identified.

A fourth aspect of the invention provides a method that determines the main object which characterizes an image. The method in the fourth aspect of the invention comprises the steps of acquiring image data which is data of the target image and which is composed of a plurality of pixel data; segmenting the image data into a plurality of pixel data groups according to the plurality of areas into which the image is split, analyzing the image data in terms of pixel data units to obtain the color range exhibited by the pixel data groups; defining color range areas by associating pixel data groups that exhibit the same color range among pixel data groups exhibiting specific color range; acquiring position data for the color range areas; acquiring position conditions stipulating the position where an object that corresponds to the specific color range to be present; and determining the main object that characterizes the image using the color range and position data of the acquired color range areas as well as the position conditions.

The method in the fourth aspect of the invention can provide the same to action and effects as the image processing device in the first aspect of the invention, and the method in the fourth aspect of the invention can also be realized in a variety of ways in the same manner as the image processing device in the first aspect of the invention.

A fifth aspect of the invention provides a method that determines the main object which characterizes an image. The method in the fifth aspect of the invention comprises the steps of acquiring image data which is data of the target image; segmenting the image data into a plurality of areas for analysis in terms of area units; acquiring position data of the areas of the image data; and determining the main object using the acquired position data and the results of analysis.

The method in the fifth aspect of the invention can provide the same action and effects as the image processing device in the second aspect of the invention, and the method in the fifth aspect of the invention can also be realized in a variety of ways in the same manner as the image processing device in the second aspect of the invention.

A sixth aspect of the invention provides a method that determines the main object which characterizes an image. The method in the sixth aspect of the invention comprises the steps of acquiring image data which is data of the target image and which is composed of a plurality of pixel data; segmenting the image data into a plurality of pixel data groups according to the plurality of areas into which the image is split, and analyzing the image data in terms of pixel data units; acquiring position data for the pixel data groups; and determining the main object using the acquired position data and results of analysis.

The method in the sixth aspect of the invention can provide the same action and effects as the image processing device in the third aspect of the to invention, and the method in the sixth aspect of the invention can also be realized in a variety of ways in the same manner as the image processing device in the third aspect of the invention.

The methods in the fourth through sixth aspects of the invention can also be realized in the form of programs, and computer-readable recording media on which such programs have been recorded.

A seventh aspect of the invention provides an image processing device. The image processing device in the seventh aspect of the invention comprises: main object image data determining module that determines the main object image data corresponding to the main object characterizing the image; property acquiring module that acquires the properties of the determined main object image data; correction condition acquiring module that acquires correction conditions corresponding to the properties that have been acquired; and picture quality adjusting module that adjusts the picture quality of the main object image data using the acquired correction conditions.

The image processing device in the seventh aspect of the invention can determine the main object image data corresponding to the main object characterizing the image, access correction conditions corresponding to the properties of the determined main object image data, and adjust the picture quality of the main object image data using the acquired correction conditions. It is thus possible to improve the picture quality of the main object characterizing the image.

An eighth aspect of the invention provides an image processing device for improving the picture quality of the main object characterizing an image. The image processing device in the eighth aspect of the invention comprises: main object image data specifying module that specifies the main object image data corresponding to the main object; color value acquiring module that acquires the color value of the specified main object image data; main object classifying module that classifies the main object using the acquired color values; standard color value acquiring module that acquires standard color values corresponding to the classified main object; and picture quality adjusting module that adjusts the picture quality of the main object image data using the acquired color values and standard color values.

The image processing device in the eighth aspect of the invention can classify the main object using the color values of the specified main object image data, access standard color values corresponding to the classified main object, adjust the picture quality of the main object image data using the acquired color values and standard color values. It is thus possible to improve the picture quality of the main object characterizing the image.

A ninth aspect of the invention provides an image processing method. The image processing method in the ninth aspect of the invention comprises the steps of: determining the main object image data corresponding to the main object characterizing the image; acquiring the properties of the determined main object image data; acquiring correction conditions corresponding to the properties that have been acquired; and adjusting the picture quality of the main object image data using the acquired correction conditions.

The image processing method in the ninth aspect of the invention can provide the same action and effects as the image processing device in the seventh aspect of the invention, and the method in the ninth aspect of the invention can also be realized in a variety of ways in the same manner as the image processing device in the seventh aspect of the invention.

A tenth aspect of the invention provides an image processing method for improving the picture quality of the main object characterizing an image. The image processing method in the tenth aspect of the invention comprises the steps of: specifying the main object image data corresponding to the main object; acquiring the color value of the specified main object image data; classifying the main object using the acquired color values; acquiring standard color values corresponding to the classified main object; and adjusting the picture quality of the main object image data using the acquired color values and standard color values.

The image processing method in the tenth aspect of the invention can provide the same action and effects as the image processing device in the eighth aspect of the invention, and the method in the tenth aspect of the invention can also be realized in a variety of ways in the same manner as the image processing device in the eighth aspect of the invention.

The methods in the ninth and tenth aspects of the invention may also be realized in the form of programs, and computer-readable recording media on which such programs have been recorded.

BRIEF DESCRIPTION OF THE DRAWINGS

FIG. 8 schematically illustrates another course of the process that determines the main object which is carried out by the color printer.

FIG. 9 schematically illustrates the course of the process that determines the main object following FIG. 8.

FIG. 10 schematically illustrates an example of a table storing determination threshold values used to determine the hue of pixel data groups.

FIG. 11 illustrates an example of object determining conditions used to determine objects corresponding to pixel data groups (color range areas).

FIG. 15 illustrates an example of a table storing correction standard values and classification color values which are used in the picture quality adjusting process on the main object.

FIG. 16 illustrates an example of a table storing standard color values which are used in the picture quality adjusting process on the main object.

FIG. 17 illustrates a table storing various values which are used when carrying out the picture quality adjusting process on main objects which have been classified in greater detail.

FIG. 21 illustrates the low correction level suitable for the limited low correction target data.

FIG. 22 illustrates the correction target range for the image data GD.

DESCRIPTION OF THE PREFERRED EMBODIMENTS

The image processing devices and image processing methods of the invention are illustrated in the following embodiments with reference to the drawings.

Figure 1:
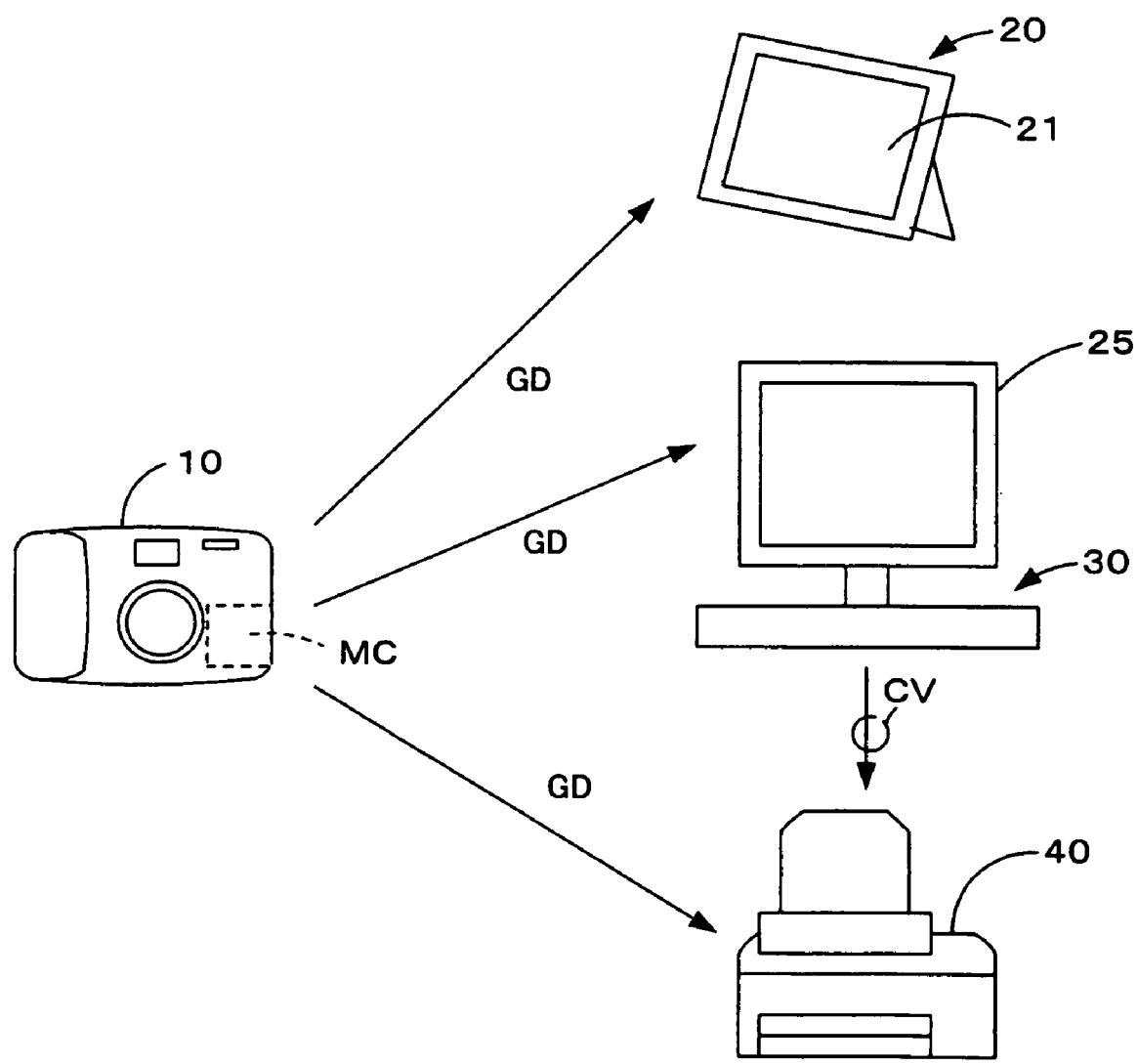
FIG. 1 illustrates the general structure of an image processing system including the image processing device used in the embodiments.
Figure 2:
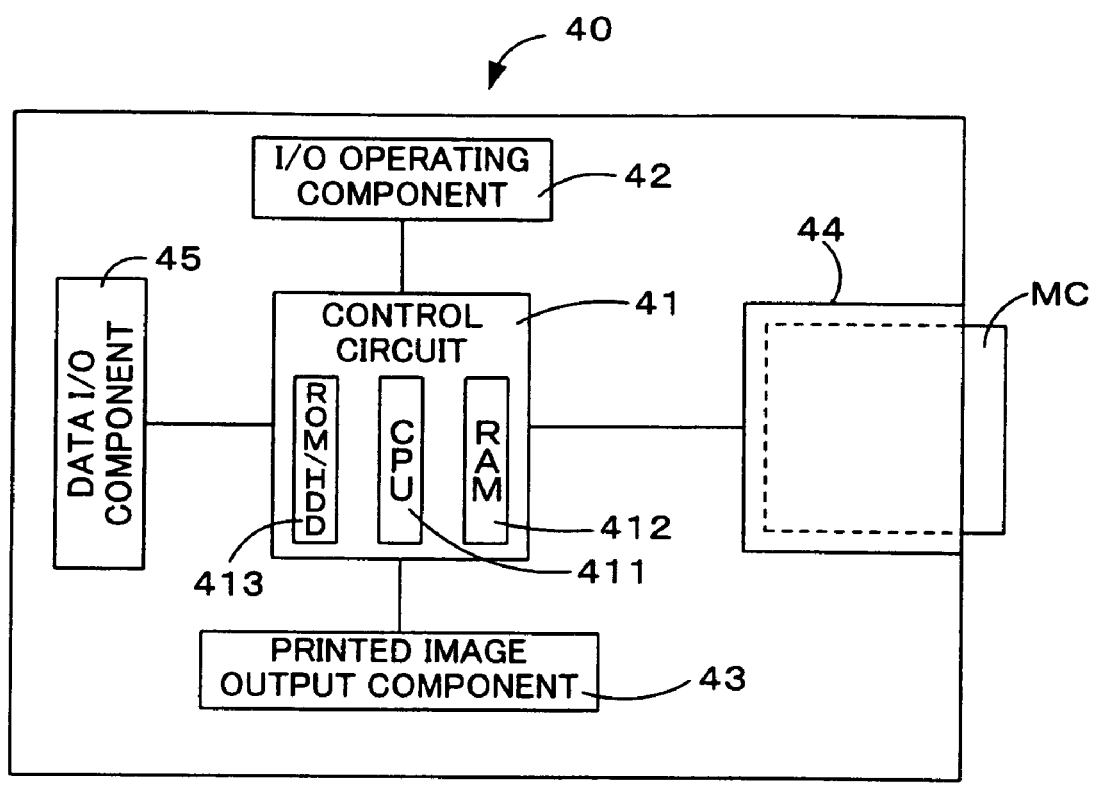
FIG. 2 illustrates the general structure of the image processing device used in the embodiments.

Shared Structure:

An image processing system comprising the image processing device used in common in the following embodiments is described below with reference to FIGS. 1 and 2. FIG. 1 illustrates the general structure of an image processing system including the image processing device used in the embodiments. FIG. 2 illustrates the general structure of the image processing device used in the embodiments.

The image processing system comprises a digital still camera 10 as an image data generating device, a display device 20 as the image processing device for implementing the image process on the image data GD, a personal computer 30, and color printer 40.

The digital still camera 10 is a camera that obtains (generates) digital image data by focusing light data on a digital device (photoelectric transducers known as CCD or photoelectric multipliers). The digital still camera 10 comprises, for example, a CCD in which R, G, and B filters are disposed according to specific rules for each structural pixel, and generates digital image data corresponding to the object. More specifically, R component pixel data is directly obtained in pixels with R filters, while G and B component pixel data is generated by interpolation based on the surrounding pixel data. The generated image data is stored in a memory card MC serving as a storage device. Examples of formats for storing image data in digital still cameras 10 include the JPEG data format as an irreversible compression storage format, and the TIFF data format as a reversible compression storage format, but other storage formats which can be used include the RAW data format, GIF data format, and BMP data format. Photographic devices such as scanners may also be used as the image data generating device.

The display device 20 functions as an electronic photograph frame, for example, having a display 21 for displaying images, and displays output images by stand-alone processing of the color image data by the same image processing as the image processing in the color printer 40 described below. The display to device 20 obtains image data from a digital still camera 10 or server on a network (not shown) through cables, for example, or through wireless communications such as IR communications or radio wave communications, and recording media. The display 21 is, for example, a liquid crystal display or organic EL display, and has the property of independent image output on each display panel.

The personal computer 30 is, for example, a general purpose type of computer, comprising a CPU, RAM, and hard disk, and executes image processes similar to the image processes in the color printer 40 described below. The personal computer 30 also comprises a memory card slot for the installation of a memory card MC, and I/O terminals to connect cables from the digital still camera 10 or the like.

The color printer 40 is capable of outputting color images. In this embodiment, it stands alone and outputs images by running an image process on image data. As illustrated in FIG. 2, the color printer 40 comprises a control circuit 41, I/O operating component 42, printed image output component 43, memory card slot 44, and data I/O component 45.

The control circuit 41 comprises a central processing unit (CPU) 411 for running various computing processes such as image processing and analytical processes on image data, a random access memory (RAM) 412 for temporarily storing various types of data such as image data which has undergone an image process and computer results, and a read-only memory (ROM)/hard disk drive (HDD) 413 for storing tables that show various parameters of the object determination conditions that identifies the main object, which is the object characterizing the image, and programs that are run by the CPU 111.

The I/O operating component 42 is an interface which receives external input, and can be realized in the form of, for example, a key operator, scroll operator, touch panel type operator.

The printed image output component 43 is an ink jet type of printed image output component that forms images by defining dot patterns by spraying four colors of ink comprising cyan (C), magenta (M), yellow (Y), and black (K), for example, onto print media based on the print image data output from the control circuit 41. Alternatively, it is an electrophotographic type of printed image output device that forms images by transferring and fixing color toner on print media. In addition to the four colors noted above, the colored ink may include light cyan (LC), light magenta (LM), blue, and red.

The memory card slot 44 is a component for the installation of various memory cards. Reading and writing to the memory card installed in the memory card slot 14 are controlled by the control circuit 41.

The data I/O component 45 has terminals for connecting cable CV and the like, and a signal conversion process function, and is used for the exchange of image data with external devices.

Figure 3:
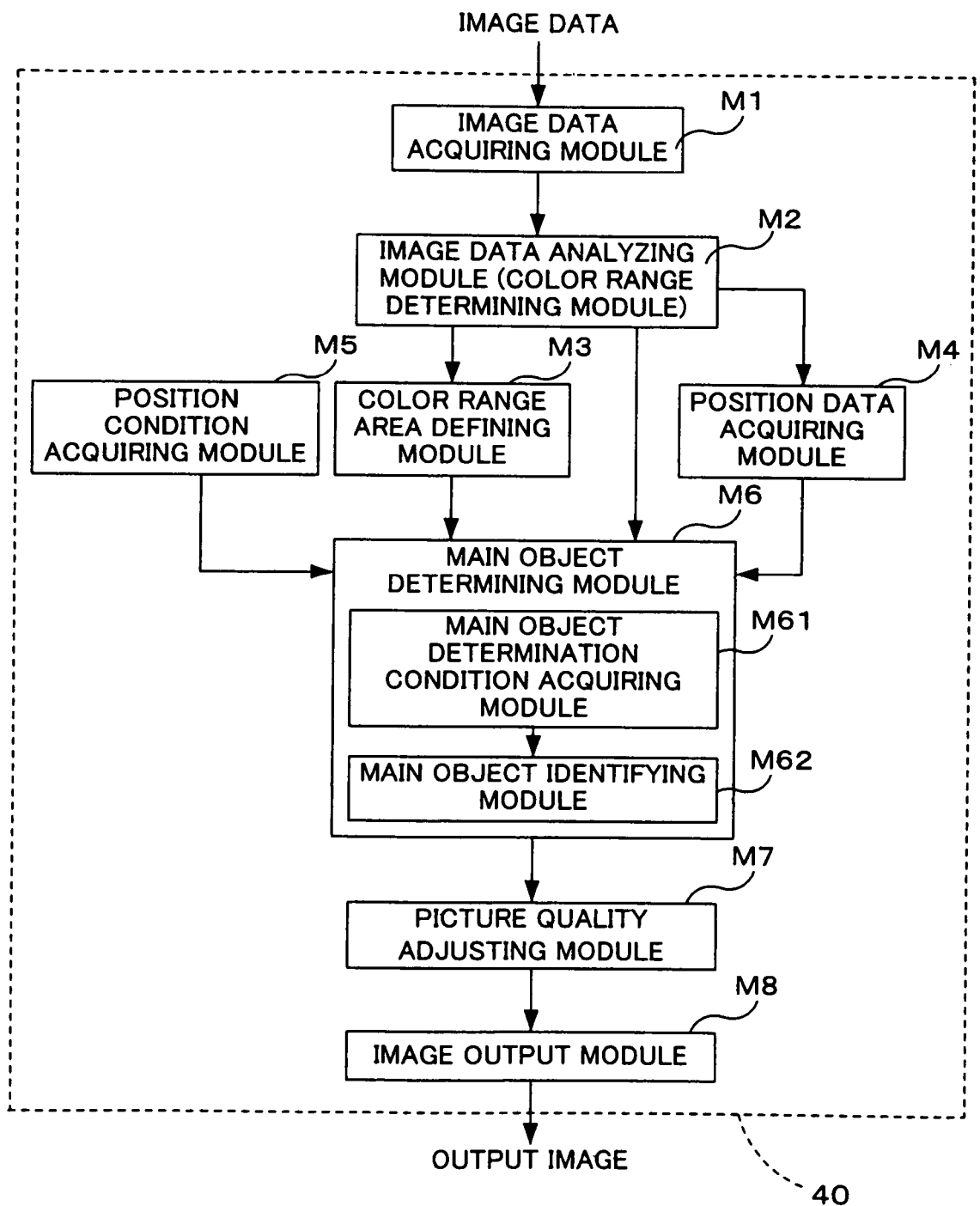
FIG. 3 is a block diagram of the functional modules realized by the control circuit 41 of the color printer 40 in the first embodiment.

First Embodiment:

A color printer 40 is used as the image processing device in the first embodiment. An outline of the modules realized by the control circuit 41 of the color printer 40 used in the first embodiment is given below with reference to FIG. 3. FIG. 3 is a block diagram of the functional modules realized by the control circuit 41 of the color printer 40 in the first embodiment. The modules illustrated in FIG. 3 can be realized in terms of the CPU 411 alone or the control circuit 41, and can be realized by either hardware or software.

The image data is acquired by the control circuit 41 by means of the image data access module M1, and is sent to the image data analysis module to (color range acquiring module) M2.

The image data analysis module M2 splits the image data into a plurality of areas (plurality of pixel data groups), and determines the color range of the split areas. The image areas are composed of 1 or more pixels, and the plurality of areas of the image data assigned to each area (plurality of pixel data groups) are composed of one or more pixel data. The color range area defining module M3 forms color range areas by associating adjacent image data areas exhibiting the same color range using the determined color range data. The position data acquiring module M4 acquires position data that forms the edges of the image present in the upper part of the image for color range areas formed using the results of the analysis of the image data. The position condition acquiring module M5 acquires position conditions stipulating where objects exhibiting specific color range to be present.

The main object determining module M6 determines the main object corresponding to the color range areas using the color range and position data of the color range areas as well as the position conditions. The main object determining module M6 can be realized in the form of an object determination condition acquiring module M61 and a main object identification module M62. In such cases, the main object can be determined without providing the color range area defining module M3 and the position condition acquiring module M5. The main object determination condition acquiring module M61 acquires object determination conditions that identifies objects by means of color range and location, and determines the main object using the color range and position data of the pixel data groups (areas) and the object determination conditions.

The picture quality adjusting module M7 adjusts the picture quality of the main object determined for the area (or pixel data group) corresponding to the main object of the image data using the data of the main object determined by the main object determining module M6. The image output module M8 outputs an image using the image data in which the picture quality has been adjusted.

Figure 4:
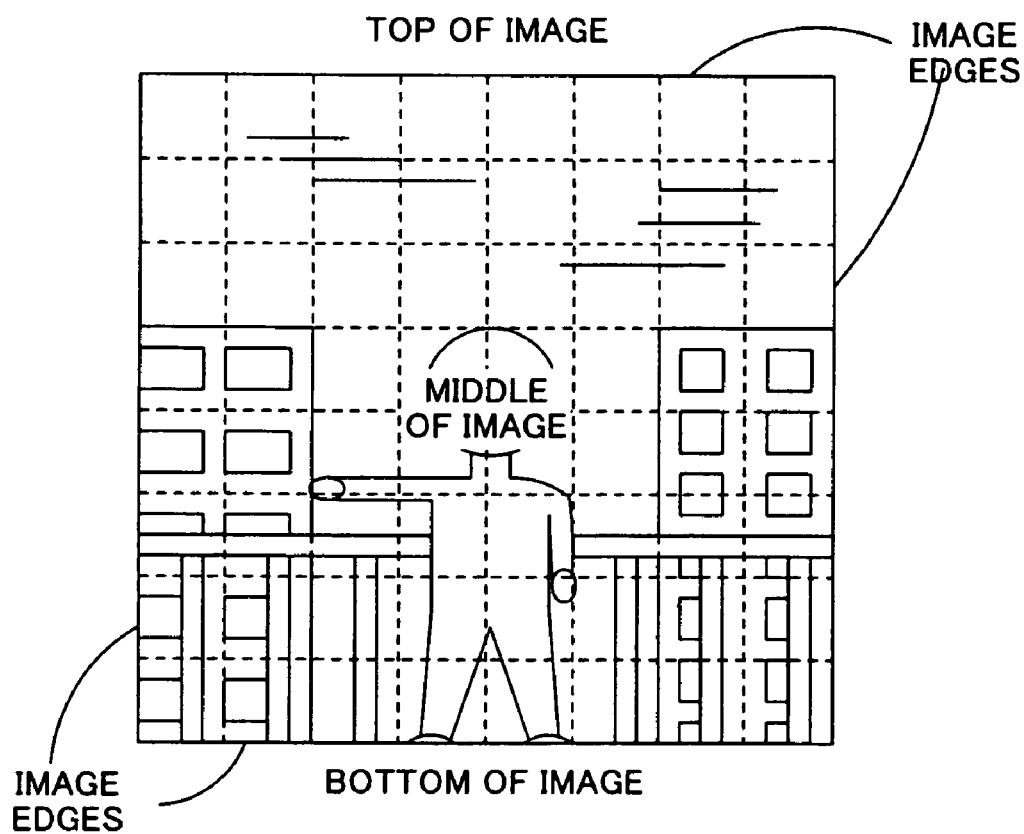
FIG. 4 schematically illustrates an example of a targeted image.
Figure 5:
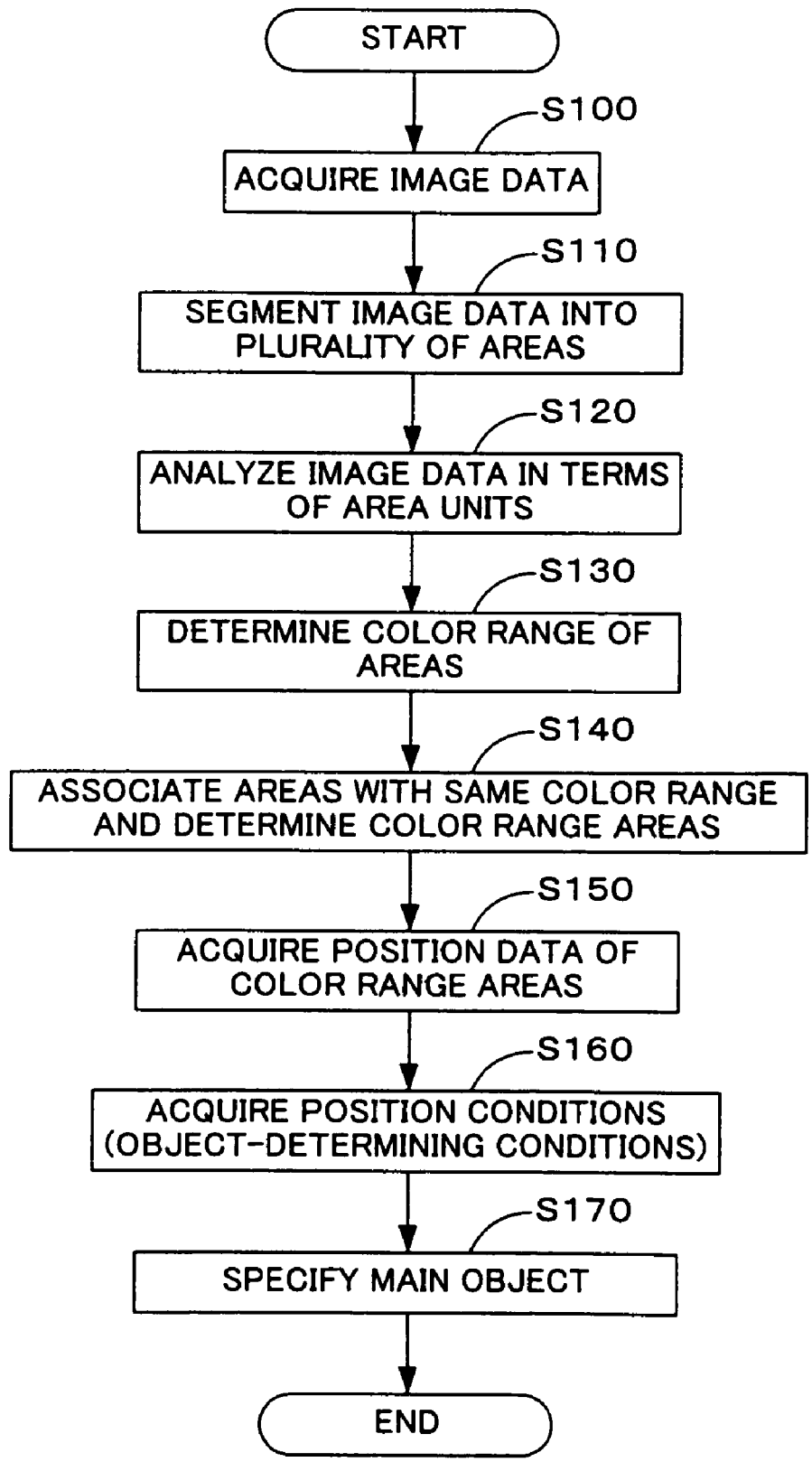
FIG. 5 is a flow chart of the process routine in a process that determines the main object which is carried out by the color printer in the first embodiment.
Figures 6, 7:
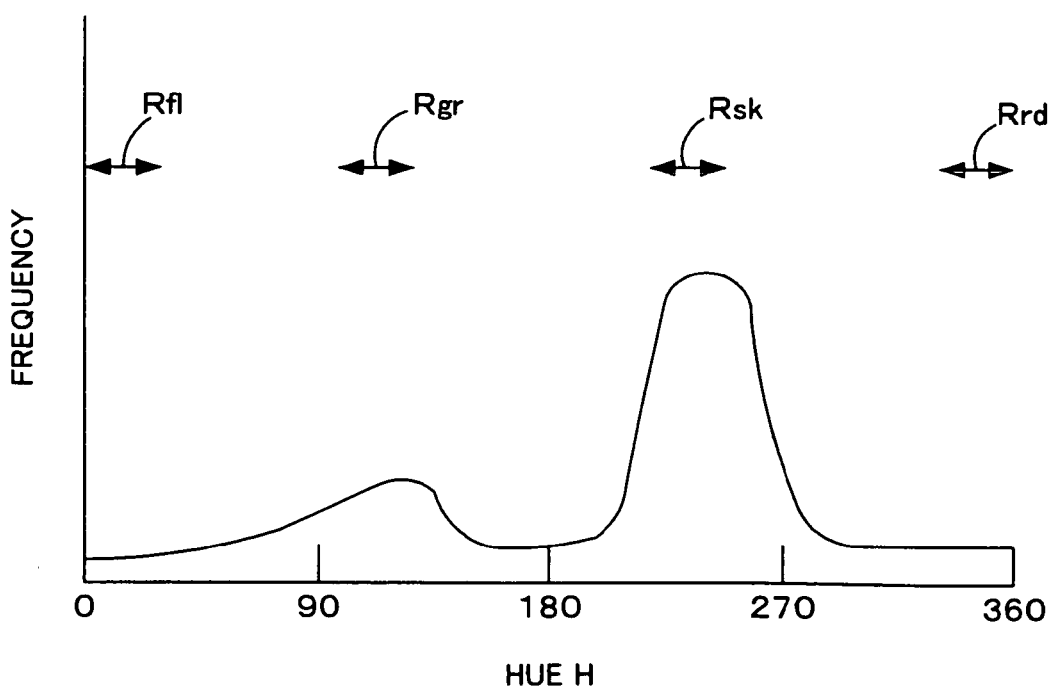
FIG. 6 schematically illustrates the course of the process that determines the main object which is carried out by the color printer.
FIG. 7 illustrates an example of the results of analysis of image data areas (pixel data groups).

A process of identifying the main object which is carried out by the color printer 40 as the image processing device in the first embodiment is described below with reference to FIGS. 4 through 11. FIG. 4 schematically illustrates an example of a targeted image. FIG. 5 is a flow chart of the process routine in the process that determines the main object which is carried out by the color printer in the first embodiment. FIG. 6 schematically illustrates the course of the process that determines the main object which is carried out by the color printer. FIG. 7 illustrates an example of the results of analysis of image data areas (pixel data groups). FIG. 8 schematically illustrates another course of the process that determines the main object which is carried out by the color printer. FIG. 9 schematically illustrates the course of the process that determines the main object following FIG. 8. FIG. 10 schematically illustrates an example of a table storing determination threshold values used to determine the hue of pixel data groups. FIG. 11 illustrates an example of object determining conditions used to determine objects corresponding to pixel data groups (color range areas).

The image data GD targeted for this process routine is image data GD corresponding to the image illustrated in FIG. 4. The top, middle, bottom, and sides indicate sites and areas shown in FIG. 4.

The process routine in FIG. 5 starts, for example, when a memory card MC is inserted into the memory slot 44 of the color printer 40 or when a digital still camera 10 is connected to the color printer 40 by a cable CV.

When the image process is started, the control circuit 41 (CPU 411) acquires the selected image data GD and temporarily stores it in RAM 412 (Step S100). Since the image data GD generated in the digital still camera 10 is generally YCbCr data, the CPU 411 converts the YCbCr data to RGB data when the selected image data GD is opened. The image data GD may be selected, for example, on a digital still camera 10 connected with or without a line to the color printer 40, or it may be selected on the color printer 40 from the image data GD stored on the memory card MC. It may also be selected from a plurality of color image data GD stored on a server via a network.

The CPU 411 splits the selected image data GD into a plurality of areas, such as 64 areas (pixel data groups), as illustrated in FIG. 6 (Step S110). To facilitate a better understanding, FIG. 6 schematically illustrates a virtual state in which image data GD has been developed on memory. Specifically, the image data GD is composed of a plurality of pixel data, and position data represented by x-y coordinates, for example, are assigned to the pixel data. Virtual split areas of the image data GD and split areas of the image as illustrated in FIG. 6 can be associated by using the location data to associate the plurality of areas into which the image has been split and the pixel data groups corresponding to the areas. In the present Specification, the split units of the image data GD that has been split in conjunction with the split areas of the image are referred to as pixel data groups or image data GD areas. The flow chart in FIG. 5 shows the steps when the image data areas or pixel data groups are composed of a plurality of pixel data. When the image data areas or pixel data groups are composed of one pixel datum, Step S110 is omitted, and the "area unit" in Step S120 is changed to "pixel (pixel datum)," "each area" in S130 is changed to "each pixel (each pixel datum)," and "areas with the same color range" in S140 is changed to "pixels (pixel data) with the same color range."

The CPU 411 analyzes the image data GD in area units (Step S120), and determines the color range (color value) of each area of the image data GD (Step S130). For the sake of simplicity, the hue is used as the color range parameter in the following description. Specifically, the CPU 411 converts the RGB image data GD, for example, to HSV image data, and produces a histogram such as that illustrated in FIG. 7, for the hues in terms of the area units of the color image data. In this case, the HSV color space represents the color image data GD by means of hue H, saturation S, and brightness V. The hue H of the color image data GD can otherwise be obtained by converting the image data GD to HSL color space. The following Equations (1) through (3) are used for the image data with RGB color components in the conversion of the RGB image data GD to HSV image data.

$$R = V_{max} \quad H = \frac{\pi}{3}\left(\frac{G-B}{V_{max} - V_{min}}\right) \quad \text{Equation (1)}$$

$$G = V_{max} \quad H = \frac{\pi}{3}\left(2 + \frac{B-R}{V_{max} - V_{min}}\right) \quad \text{Equation (2)}$$

$$B = V_{max} \quad H = \frac{\pi}{3}\left(4 + \frac{R-G}{V_{max} - V_{min}}\right) \quad \text{Equation (3)}$$

Here, V max=max {R, G, B}, and V min=min {R, G, B}. When V max=V min, the hue is indefinite (achromatic). When the hue H<0, $2\pi$ is added to the calculated hue H. As a result, the value range of the hue H is 0 to $2\pi$, but in this embodiment, the hue H is expressed with a value range of 0 to 360 degrees.

In the histogram illustrated in FIG. 7, the hue range corresponding to flesh tones is Rfl, the hue range corresponding to green is Rgr, the hue range corresponding to sky blue is Rsk, and the hue range corresponding to red is R rd. In the histogram illustrated in FIG. 7, the hue for sky blue is represented with high frequency, and it can be assumed that the image data GD targeted for analysis corresponds to a photograph based on the sky.

The CPU 411 determines the proportion of the number of pixel data representing a specific hue relative to the total number of pixel data defining the areas in the image data GD, and determines the proportion of the specific color range exhibiting the highest proportion among them as the maximum proportion Humax. Specifically, since the pixel data represents specific hues by means of R, G, and B components, the numbers of pixel data exhibiting each hue are respectively calculated for specific hues, and the following Equation (4) is used to calculate the proportion of hues Hurate in the areas of the image data GD.

$$Hurate = \frac{\text{number of pixel data of specific hue}}{\text{number of total pixel data in areas}} \quad \text{Equation (4)}$$

The CPU 411 determines the hue of the areas of the image data GD using hue determining reference values (Huref_sk, Huref_gr, Huref_fl, Huref_rd) (see FIG. 10) that determines the proportions Hurate of each hue and the hues of the areas in the image data GD (hues representing the areas, and hues exhibited by the areas). In this case, the hue determining reference values are different for each hue. When a plurality of hues meets the hue determining reference value, the hue corresponding to the lower (smaller) hue determining reference value, for example, to be used as the hue of the area in the image data GD.

When the CPU 411 determines the hues for the areas in the image data GD, adjacent areas of the same color range are associated to determine color range areas (Step S140). Specifically, the following process is carried out. As illustrated in FIG. 6, areas are scanned, from the top left area (0,0), in the direction indicated by the arrow X, to determine the color range of the areas, and the same symbol is assigned to areas of the same color range. In the embodiment in FIG. 6, Sn is assigned to areas exhibiting a sky blue hue, Fn is assigned to areas exhibiting a flesh toned hue, and Rn is assigned to areas exhibiting a red hue (n is a number distinguishing color range areas of the same hue). When the CPU 411 reaches the upper right area (7,0), scanning moves down one step in the direction indicated by arrow Y, and the areas are similarly scanned in the direction of the arrow X to determine the color range of the areas, until the lower right area (7,7) is eventually reached. In the embodiment in FIG. 6, there are two color range areas (A1, A2) exhibiting sky blue color rangecolor range, and one color range area (A3) exhibiting a flesh toned color range.

Another embodiment of the process that determines color range areas is described with reference to FIGS. 8 and 9. In the other embodiment, as shown in FIG. 8, initially there are three color range areas exhibiting a sky blue color range (A4, A5, A6), and one color range area exhibiting a flesh toned color range (A7). This is because no area exhibiting sky blue is present in the adjacent area (0,3). However, the sky blue color range area A5 starting from area (0,3) is adjacent to area (7,2) of the sky blue color range A4 at area (7,3). The CPU 411 determines the sky blue color range area A4 and the sky blue color range area A5 to be the same color range area A4, as illustrated in FIG. 9, and re-assigns the symbol S1 to the areas of color range area A5, determining a new color range area A4.

When the CPU 411 determines color range areas, position data is obtained for the color range areas, such as A1 through A3 in FIG. 6 (Step S150). Because, as noted above, position data is pre-assigned to the pixel data defining the areas, the position data is used, for example, to specify the boundaries between the color range areas to obtain position data on the color range areas.

The CPU 411 obtains position conditions (object-determining conditions) from the ROM/HDD 413 (Step S160). The position conditions (object-determining conditions) are conditions used to determine whether or not the color range areas correspond to a certain object by means of the color range and position data of the color range areas. These are stored in the form of a table such as the one in FIG. 11, for example, in the ROM/HDD 413.

Based on the hue of the color range areas, the CPU 411 first narrows the object candidates corresponding to the color range areas to either "sky, green, or persons." In the embodiment in FIG. 6, because color range areas A1 and A2 exhibit sky blue, the "sky" is a main object candidate, and since color range area A3 exhibits a flesh tone, "person (face)" is a main object candidate.

The CPU 411 then compares the position data of color range areas A1 and A2 with the position data corresponding to the sky to determine the main object (Step S170), and the process routine is complete. The position data stipulates that the sky is in the upper part of the image and touches the edges, that green is in the lower part of the image and touches the edges, and that flesh tones are in the middle of the image. In other words, the position conditions stipulate that the sky is any of area (x,0): 0≦x≦7, area (0,y): 0≦y≦2, or area (7,y): 0≦5. Green is stipulated as being any of area (x,7): 0≦x≦7, area (0,y): 4≦y≦7, or area (7,y): 4≦7. People are stipulated as being (x,y): 2≦x≦5 and 2≦y≦5.

When these conditions are taken into consideration, the corresponding main object can be determined to be the sky because the color range area A1 includes an area, such as area (0,0), which meets the position conditions. The color range area A2, meanwhile, does not include areas meeting the position conditions, and the corresponding main object can thus be determined not to be the sky. The color range area A2 corresponds to sky blue clothing, for example.

The color range area A3 includes an area, such as area (3,4), which to meets position conditions, and the corresponding main object can thus be determined to be a "person (face)."

As described above, when the main object characterizing an image is identified (determined) by the color printer 40 as the image processing device in this embodiment, the image data GD is split (divided) into a plurality of areas, color range areas are determined by associating adjacent areas exhibiting the same color range, and main objects to which the color range areas correspond are determined using the color range exhibited by the color range areas and the position data of the color range areas. That is, when the main object corresponding to the color range areas is determined, the determination is made using position conditions where the specified main object to be present in addition to the color range data which the specific main object should have. It is thus possible to make more accurate determinations, that is, to reduce determination errors, compared to when the main object is determined using just color range data. Specifically, as noted above, just the color range data is used, it is highly possible that color range areas corresponding to sky blue clothing located near the middle of the image will be mistakenly determined to be the sky, whereas the image processing device and method in this embodiment will not erroneously determine sky blue clothing to be the sky because the position conditions where the sky to be located are taken into consideration.

Figure 12:
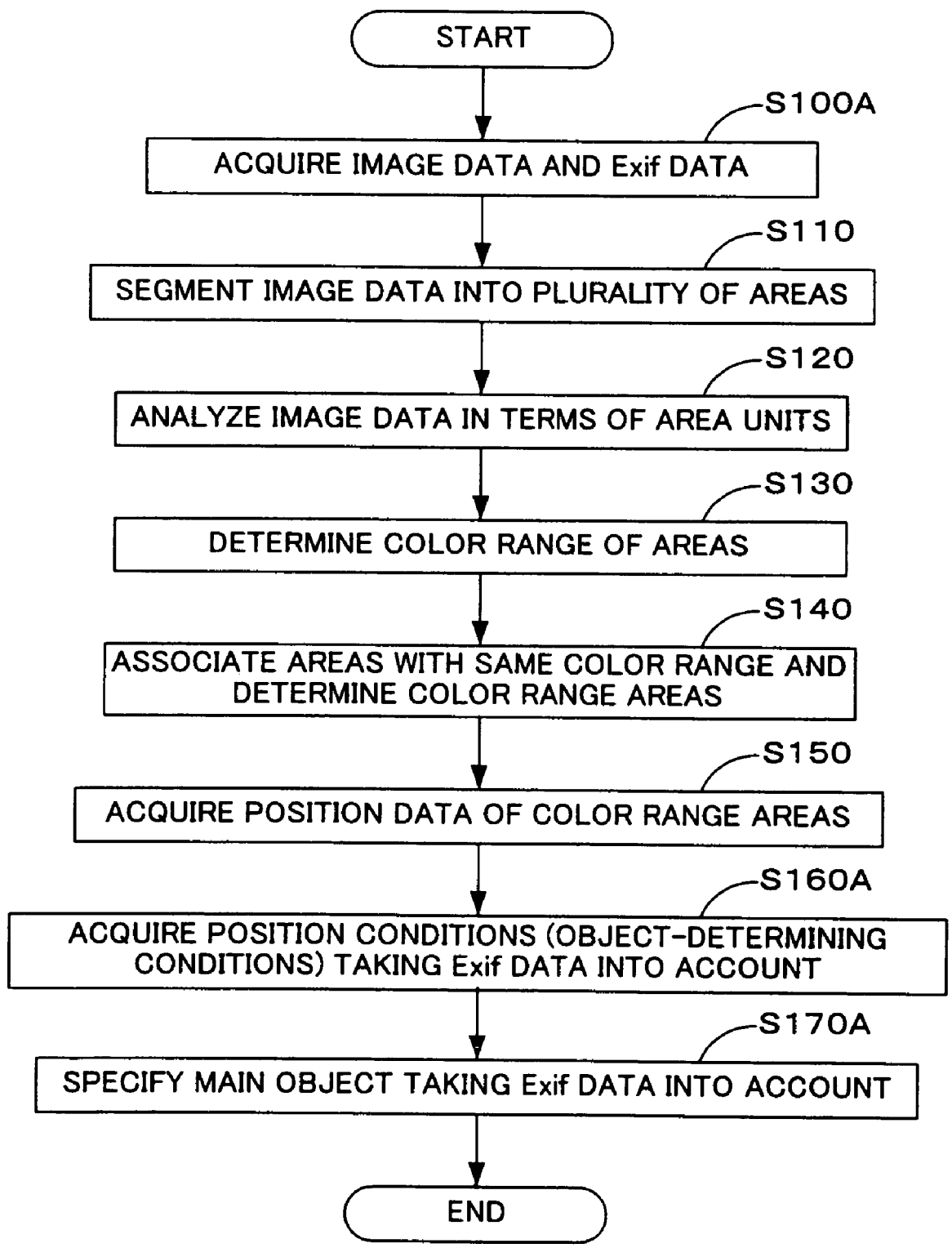
FIG. 12 is a flow chart of the process routine in the process that determines the main object which is carried out by the color printer in another embodiment.

Variant of First Embodiment:

1) A variant of the process that determines the main object in the first embodiment will be described with reference to FIG. 12. FIG. 12 is a flow chart of the process routine in the process that determines the main object which is carried out by the color printer in the variant of the first embodiment. Steps in FIG. 12 which are similar to the steps in FIG. 5 will be described only briefly.

The process routine in FIG. 12 starts, for example, when a memory card MC is inserted into the memory slot 44 of the color printer 40 or when a digital still camera 10 is connected to the color printer 40 by a cable CV.

When the image process is started, the control circuit 41 (CPU 411) acquires the selected image data GD, and acquires Exif data associated with the image data GD, temporarily storing it in RAM 412 (Step S100A). The Exif data shows the conditions at the time the photograph was taken, which are recorded along with the image data in Exif files based on Exif (exchangeable image file format), a unified standard of file format including image data produced by digital still cameras 10. The Exif standards have been adopted by the Japan Electronics and Information Technology Industries Association (JEITA). Exif data can include, for example, exposure time, light source, object area, type of photographed scene, photograph time (the date and time when the original image data is produced or the date and time when digital data is produced), and gyro data (angle of rotation from normal position). Exif data is stored in a format which includes offset data and actual data in the file header, and can be acquired in the necessary data based on the offset data stipulated for the data. The image data GD (graphic file) is selected as described above.

As noted above, the CPU 411 splits the selected image data GD into a plurality of areas, such as 64 areas (pixel data groups), as illustrated in FIG. 6 (Step S110). The CPU 411 analyzes the image data GD in terms of area units (Step S120), and determines the color range (hues) of the areas in the image data GD (Step S130). When the hues of the areas of the image data GD have been determined, the CPU 411 determines the color range areas by associating adjacent areas of the same color range (Step S140). When the CPU 411 determines the color range areas, position data for the color range areas such as A1 to A3 in FIG. 6 is obtained (Step S150). The specific process in Steps 5120 through 5150 has already been described using FIG. 5.

The CPU 411 obtains position conditions (object-determining conditions) from the ROM/HDD 413, and first determines the position conditions (object-determining conditions) taking the Exif data into consideration (Step S160A). The position conditions (object-determining conditions) are conditions used to determine whether or not the color range areas correspond to a certain object by means of the color range and position data of the color range areas. These are stored in the form of a table such as the one in FIG. 11, for example, in ROM/HDD 413. In this embodiment, the position conditions obtained from the table in FIG. 11 are revised in consideration of the gyro data, for example, to determine the final position conditions (object-determining conditions).

That is, in the position conditions in FIG. 11, it is stipulated that the sky is in the upper part of the image and touches the edges, that green is in the lower part of the image and touches the edges, and that flesh tones are in the middle of the image. However, when a photographer takes a photograph with the digital still camera 10 turned upside down, for example, the sky will be inverted and will thus be in the lower part of the image and touch the edges of the image, while green images will be in the upper part of the image and touch the sides of the image. As a result, the position conditions in FIG. 11 cannot be used, since they assume that the photograph was taken with the digital still camera 10 in the normal position.

In this embodiment, the position conditions are corrected by taking into consideration the gyro data showing the angle of rotation relative to the normal position, and the final position conditions are then determined. In the above embodiment, the gyro data shows a value of about 180 degrees. The position conditions in FIG. 11 are thus corrected so that the sky is in the lower part of the image and touches the edges of the image, and green images are in the upper part of the image and touch the edges of the image. When the digital still camera 10 is used while rotated about 90 degrees to the left relative to the normal position, the conditions are corrected so that the sky is on the side of the image (such as the right side) and touches the edges of the image, and green objects are on the side of the image (such as the left side) and touch the edges of the image. The gyro data is displayed in values of 0 to 359 degrees rotated to either the left or right.

The CPU 411 determines the main object (Step S170A) by comparing the Exif data, position conditions, and the position data of the color range areas, and the process routine is complete. When the position conditions are taken into consideration, The color range area A1 in FIG. 6 includes an area such as area (0,0) meeting the position conditions, allowing the corresponding main object to be determined as the sky. The main object corresponding to the color range area A1 can be determined to be the sky when, upon consideration of the time data included in the Exif data, the hue of the color range area A1 is sky blue in the afternoon, is red at evening, or is black at night. Alternatively, the main object corresponding to the color range area A1 can be determined to be the sky when, upon consideration of the type of photograph scene included in the Exif data, the hue of the color range area A1 is sky blue when the type of photograph scene is a landscape, is red when the type of scene is evening, or is black when the type of scene is a night time scene.

Even though the color range area A2 in FIG. 6 exhibits a sky blue hue, the corresponding main object can be determined not to be the sky in cases where the type of photograph scene is of people (portrait), since the main object is a person in addition to the lack of any areas meeting the position conditions. The color range area A2 corresponds to sky blue clothing, for example.

When the type of photograph scene is of a person (portrait), the color range area A3 in FIG. 6 includes an area such as area (3,4) meeting position conditions, and the main object is a "person," making it possible to more accurately determined that the corresponding main object is a "person (face)."

In the above embodiment using the Exif data, it is possible to more accurately determine what the main object is by referring to the photograph conditions.

2) In the above embodiment, the position data of areas defining the color range areas was used as the position data of the color range areas, but the position data of pixel data defining the color range areas may also be used. In such cases, more specifically, comparisons can be made with the position conditions, and the position of the color range areas can be determined even more accurately.

3) In the above embodiment, color range areas in which adjacent areas having the same color range had been associated were used to determine the main object, but the main object may also be determined in terms of area units or pixel data units without the use of color range areas. When the main object is determined in terms of area units, main objects corresponding to the areas are first determined, and all areas corresponding to the same main object are then put together, making it possible to form areas of the image data GD corresponding to the main object. More specifically, position data and color range of areas which are met by areas corresponding to a certain main object are stipulated as position conditions (object-determining conditions), and the position data and color range of the areas are compared.

Alternatively, when the main object is determined in terms of pixel data units, the main objects corresponding to the pixel data are first determined, and to all the pixel data corresponding to the same main object are then put together to form image data GD areas (pixel data groups) corresponding to the main object. More specifically, position data and color range of areas which are met by pixel data corresponding to a certain main object are stipulated as position conditions (object-determining conditions), and the position data and color range of the areas are compared. In such cases, the main object can be determined more accurately from the standpoint of both the color range and positions.

4) The use of hue H as a color range parameter in the image data GD areas (pixel data groups) was described in the above embodiments, but in addition to the hue H, at least either saturation S or brightness (luminance) V may be used as a parameter for a more comprehensive determination. The color range of the image data GD areas (pixel data groups) may also be specified in terms of RGB color space or YCbCr color space instead of HSV color space.

5) In the above embodiments, a color printer 40 was used as the image processing device, but a display device 20 and personal computer 30 may also be used. In such cases, the same effects as in the above embodiments can be obtained.

6) In the above embodiments, the image process was carried out with software, that is, in the form of a computer program, but it may also be carried out using image processing hardware circuitry comprising a logic circuit for implementing the above processes (steps). In such cases, the load on the CPU 411 can be alleviated, allowing the process to be implemented more rapidly. The image process hardware circuit can be implemented as a circuit for the display device 20 and color printer 40, for example, and as an add-on card for the personal computer 30.

Second Embodiment:

A second embodiment of the image processing device and image processing method is described below. Specific image processing details in the second invention differ from the image process in the first invention, and the structure of the modules of the image processing device (color printer) in the second invention differs from the structure of the modules of the image processing device (color printer) in the first embodiments. However, as the basic structure of the color printer in the second embodiment and the color printer 40 in the first embodiment are the same, the same symbols will be used without further elaboration in the following description of the color printer 40.

Figure 13:
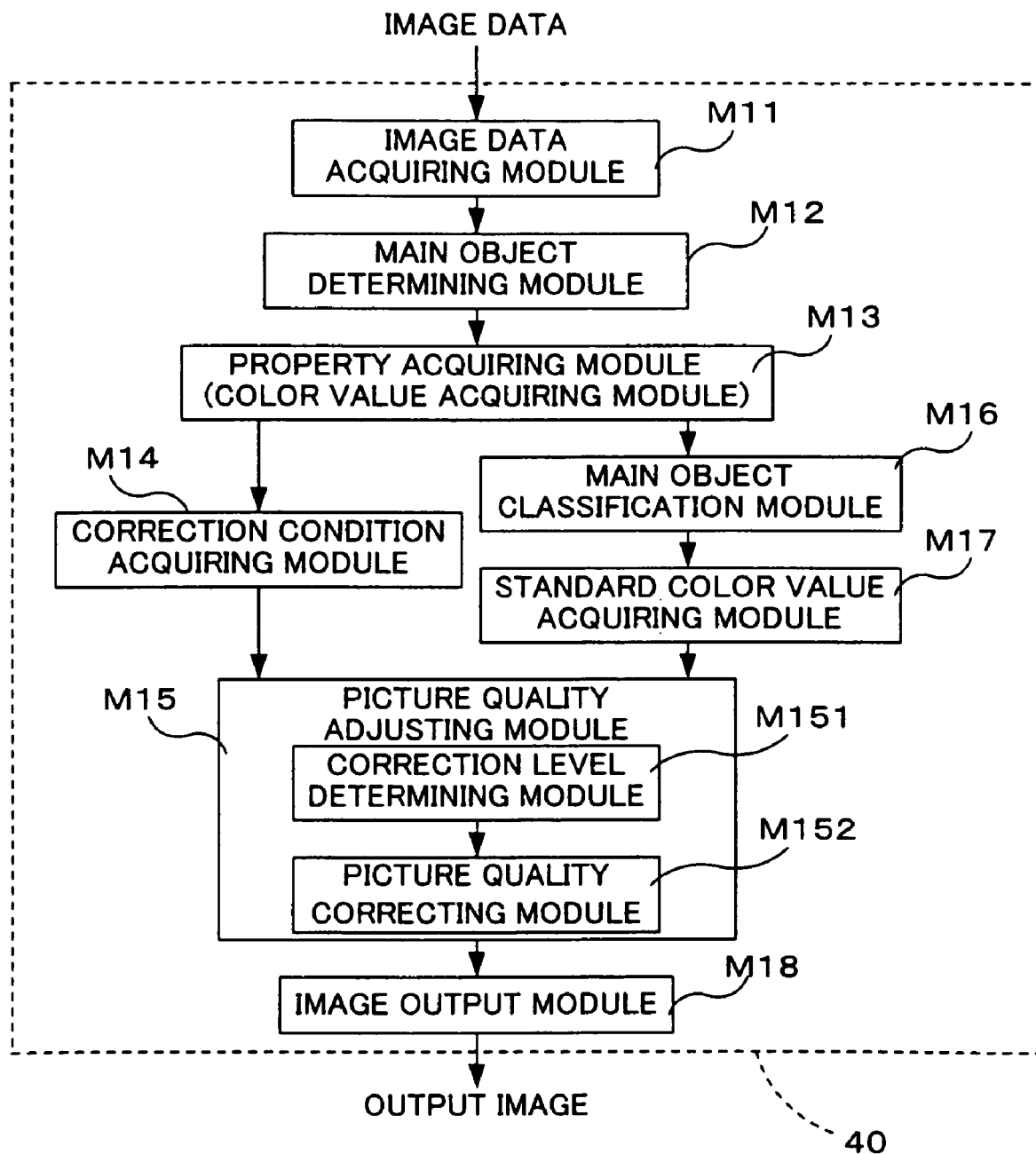
FIG. 13 is a block diagram of the functional modules realized by the control circuit 41 of the color printer 40 in a second embodiment.

An outline of the modules realized by the control circuit 41 of the color printer 40 in the second embodiment will be described with reference to FIG. 13. FIG. 13 is a block diagram of the functional modules realized by the control circuit 41 of the color printer 40 in the second embodiment. The modules illustrated in FIG. 13 can be realized in terms of the CPU 411 alone or the control circuit 41, and can be realized by either hardware or software.

The image data is acquired by the control circuit 41 by means of the image data access module M11, and is sent to the main object image data determination module M12. The main object image data determination module M12 splits the image data into a plurality of areas (plurality of pixel data groups), and determines the color range of the split areas, and obtains color range data and position data for the split areas. The main object image data determination module M12 determines the image data areas corresponding to the man object characterizing the image, that is, the main object image data, using the acquired color range data and position data of the split areas. The main object(s) can be one or more main objects that are the same or different among the image.

When the main object and the image data areas corresponding to the main object are determined, the property acquiring module M13 acquires the properties of the main object image data (such as statistical values and color values). The correction condition acquiring module M14 acquires correction conditions corresponding to the acquired properties (such as statistical values and color values) of the main object image data. A plurality of correction conditions are prepared for each type of main object, permitting more suitable adjusting of the picture quality according to the properties of the main object.

The picture quality adjusting module M15 prepares the acquired correction conditions to carry out a process that adjusts the picture quality of the main object image data. When there is a plurality of main objects, the picture quality adjusting module M15 carries out a picture quality adjusting process on the image data areas corresponding to each of the main objects. The picture quality adjusting module M15 may access correction standard values as the correction conditions, determine the correction level so as to eliminate or reduce differences between the correction standard values and the property values of the main object image data, and adjust the picture quality of the main object image data by applying the correction level that has been determined. The correction level may be determined in a standardized way or according to image process control data indicating the image process conditions for the image data associated with the image data.

A main object classification module M16 and a standard color value acquiring module M17 may be provided instead of the correction condition acquiring module M14. The main object classification module M16 uses the acquired data corresponding to the main object to classify the main object in greater detail, such as clear sky, ordinary sky, and dark sky. The standard color value acquiring module M17 acquires standard color values corresponding to the classified main object. That is, the ideal color values of the classified main object, such as the ideal color values for bright sky, ordinary sky, and dark sky, are acquired.

The correction level determining module M151 determines the correction level so as to eliminate or reduce color range differences between the acquired standard color values and the main object image data. The correction level may be determined in a standardized way or according to image process control data indicating the image process conditions for the image data associated with the image data.

The picture quality correcting module M152 applies the determined correction level to the main object image data to adjust the picture quality of the main object image data. When there is a plurality of main objects, the picture quality adjusting process is carried out on the image data areas corresponding to each of the main objects.

The image output module M18 outputs the output image using the image data in which the picture quality has been adjusted.

The main object identifying process implemented by the color printer 40 as the image processing device in the second invention is the same as the main object identifying process implemented by the color printer as the image processing device in the first embodiment, and will therefore not be further elaborated.

Figure 14:
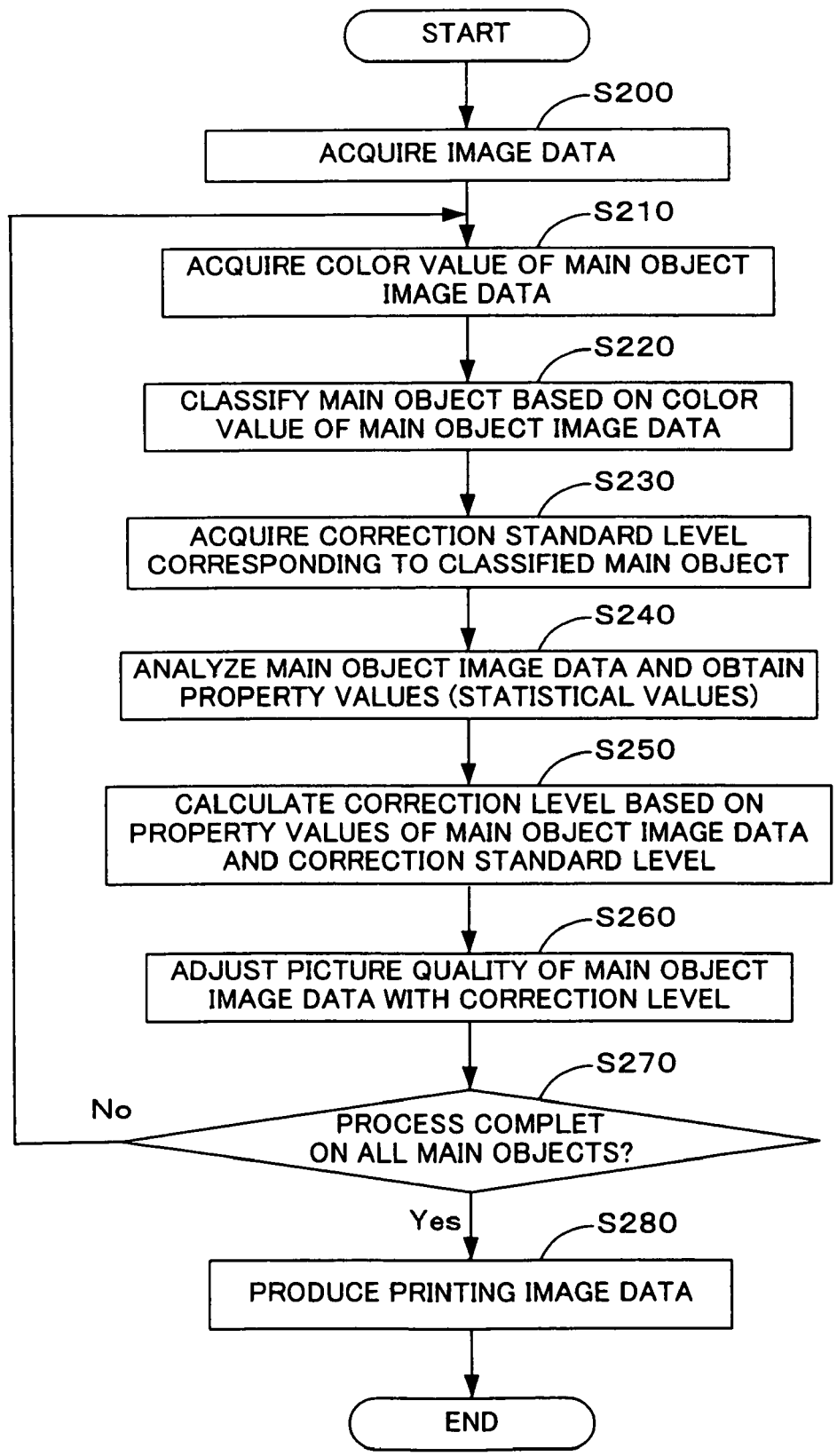
FIG. 14 is a flow chart of the process routine in the process that adjusts the picture quality of the main object which is carried out by the image processing device in the second embodiment.

Adjustment of Picture Quality According to Main Object:

An image process for image data corresponding to the identified main object will be described with reference to FIGS. 14 and 15. FIG. 14 is a flow chart of the process routine in the process that adjusts the picture quality of the main object which is carried out by the image processing device in the second embodiment. FIG. 15 illustrates an example of a table storing correction standard values and classification color values which are used in the picture quality adjusting process on the main object.

The CPU 411 acquires image data GD for which the main object image data determination process has been completed (Step S200), and color values for the specified main object image data (color range areas and areas corresponding to the main object of the image data) (Step S210). The color values of the main object image data are obtained when the main object image data is determined, and are stored in RAM 412.

The CPU 411 classifies the main object based on the color values of the main object image data (Step S220). That is, the same type of main objects are classified into more detailed main objects to implement better picture quality adjustment of the main object image data. The example in FIG. 15 shows classification color values for more detailed classification of the sky into clear sky (few clouds), ordinary sky, and dim sky (overcast summer sky). The classification color values can be values statistically determined for a plurality of images, for example. Specifically, the CPU 411 uses the following Equation (5) to determine the difference C (interval) between the color values (H, S, B) of the main object image data and the classification color values (H cs, S cs, B cs) in FIG. 13, and the main object corresponding to the classification color values with the lowest difference C (interval) becomes the detailed main object to which the main object image data corresponds. Here, $\Delta H = H\,cs - H$, $\Delta S = S\,cs - S$, and $\Delta B = B\,cs - H$.

$$C = \sqrt{(\Delta H)^2 + (\Delta S)^2 + (\Delta B)^2} \qquad \text{Equation (5)}$$

The CPU 411 acquires the correction standard values corresponding to the classified main object (detailed main object) (Step S230). The correction standard values are established, as shown in FIG. 15, for example, for each type of picture quality parameter for each classified detailed main object, so that detailed main objects could be output at their most attractive. That is, the correction standard values stipulate the ideal values of the various parameters in relation to detailed main objects. Here, the picture quality parameters are parameters related to the picture quality of the image data, and include, for example, shadow, highlight, brightness, contrast, color balance, and memory color correction parameters.

The CPU 411 carries out various processes on the image data GD of the RGB data. The CPU 411 analyzes the main object image data to obtain the property values (statistical values) of the main object image data (Step S240). The property values (statistical values) include, for example, maximum and minimum luminance, and histograms of R, G, and B components in the main object image data.

The CPU 411 uses the property values of the main object image data and the acquired correction standard values to calculate the correction level so as to reduce or eliminate the difference between the two. The extent to which the difference between the property values of the main object image data and the acquired correction standard values is reduced, that is, the level of correction, may be determined in a standardized way or, when image process control data has been associated with the image data GD, determined according to the correction level stipulated by the image process control data. Here, the image process control data is data stipulating the image processing conditions for the associated image data, and includes, for example, the values of one or more picture quality-related parameters.

The CPU 411 applies the calculated correction level to adjust the picture quality of the main object image data (Step S250). The picture quality adjusting to process is carried out on picture quality parameters such as shadow, highlight, brightness, contrast, color balance, and memory color correction, using a tone curve (S curve) correlating the input and output levels of the RGB components of the photograph image data GD. IN picture quality adjusting processes involving the use of a tone curve, the correction levels for the various picture quality adjusting parameters are used to modify the tone curves for the RGB components or individual R, G, B components.

Specifically, points at which a level of correction is applied to picture quality parameters are established by experiment on the tone curves, and correction levels are applied, so that the points through which the tone curve passes is modified at the points, and the input-output properties are modified. Accordingly, when modified R, B, and B tone curves are applied to main object image data, the input and output of the RGB components of the main object image data are modified, resulting in main object image data in which the picture quality has been modified.

Picture quality adjusting processes involving the use of correction levels for picture quality parameters (automatic picture quality adjusting processes) can be carried out specifically in the following manner, for example. Standard value means correction standard value.

The levels of correction for contrast, shadow, and highlight are determined based on standard levels by retrieving shadow points and highlight points from the main object image data, and the correction levels that have been determined are used to stretch the histograms. The correction levels are also determined based on the luminance standard deviation, and tone curves are modified using the correction levels that have been determined.

It is determined whether or not the image is dark (insufficient exposure) to or bright (overexposure) based on the luminance value calculated from the areas of the main object image data, correction levels for brightness are obtained based on the standard values, and the correction levels that have been obtained are used to correct the tone curves.

Color balance bias is analyzes based on histograms of the R, G, and B components of the main object image data, correction levels for color balance are obtained based on the standard values for the RGB components from the tone curves of the R, G, and B components, and the correction levels that have been obtained are used to correct the color balance.

The saturation distribution of the main object image data is analyzed, the correction levels for saturation are determined based on the standard levels, and the correction levels that have been determined are used to enhance the saturation.

For sharpness, the main object image data frequency and edge intensity distribution are analyzed, the un-sharp mask level (correction level) is determined based on the standard values, and the picture quality is adjusted by un-sharp masking at the correction level. The standard values are determined based on the frequency distribution. The higher the frequency image data (landscape, vegetation, etc.), the lower the standard value. The lower the frequency image data (persons, sky, etc.), the greater the standard value. The level of the un-sharp mask depends on the edge intensity distribution; its application level is greater the more blurry the properties of the image data.

The CPU 411 first determines whether or not the picture quality adjusting process has been completed on all of the identified main objects (Step S270). When main objects which should undergo the process still remain (Step S270: No), Steps S210 through 5260 are repeated. When the CPU 411 determines that no main objects which should undergo the process still remain (Step S270: Yes), printing image data is generated (Step S280), and the process routine is complete.

As described above, in the color printer 40 used as the image processing device in this embodiment, a picture quality adjusting process can be carried out on each main object image data corresponding to the identified main object, not all of the image data. It is thus possible carry out a picture quality adjusting process that makes the main objects in an image look more attractive. The picture quality of the output image as a whole can be improved by making the main object characterizing the image look more attractive (improve the picture quality).

The identified main object can also be classified in further detail, allowing the optimal picture quality adjusting process to be carried out on the classified main object. That is, the specified main object can be further characterized to improve the accuracy of the picture quality adjusting process on the main object image data. When, for example, the sky is the main object, there would be different standards with more attractive, higher picture quality for bright sky, ordinary sky, dark sky, brilliant sky, overcast sky, clear sky, and red sky, respectively. The main object can thus be made to look more attractive by specifying sky in greater detail in terms of what kind of sky it is, and carrying out the optimal picture quality adjusting process on the specified sky.

Variants of Second Embodiment:

1) In the above embodiment, a process that adjusts the picture quality of main object image data was carried out on main object image data having RGB data, that is, in terms of RGB color space, but the process may also be carried out on main object image data having HSV image data, that is, in terms of HSV color space. In such cases, the CPU 411 uses the color values of the main object image data and the standard color values to calculate the correction level so as to reduce or eliminate the difference between the two. The standard color values are color values for the attractive output of detailed main object images. As illustrated in FIG. 16, for example, the hue H, saturation S, and brightness (luminance) V are stipulated for detailed main object images which have been classified. FIG. 16 illustrates an example of a table storing standard color values which are used in the picture quality adjusting process on main objects.

The process that determines the correction level using color values is carried out so as to reduce or eliminate differences between the color values. The extent to which the difference between the two color values is reduced, that is, the level of correction, may be determined in a standardized way or, when image process control data has been associated with the image data GD, determined according to the correction level stipulated by the image process control data. When color values are used, the picture quality adjusting process is carried out with HSV color space, allowing a more faithful picture quality adjusting process to be carried out. That is, the accuracy of the picture quality adjusting process can be improved.

When the picture quality adjusting process is carried out in HSB color space, the correction level may be determined using classification color values instead of standard color values. That is, the classification color values and standard color values need not necessarily be separate color values. When the ideal, target color values of the detailed main object are used as classification color values, they may also be used as the standard color values. In such cases, the process for classifying the main object image and the process that determines the correction level can be carried out simultaneously.

2) When different types of main object image data are included in the to image data in the above embodiment, the correction level applied to the main object image data may be determined by taking into consideration the presence of the different types of main object image data. In such cases, it is possible to prevent the adjustment of the picture quality from making the main object image data more conspicuous (stand out), so that the image as a whole is more harmonious. Specifically, for example, the correction level can be reduced at the borders between main object image data, or standard color values and correction standard values, which are weighted according to the distance between main objects, can be used as standard color values and correction standard values serving as correction indicators.

3) "Sky" was used as an example of the main object in the above embodiments, but the same effects can otherwise be obtained for "people (faces)," "vegetation," and the like. In the case of "people (face)," for example, the object can be further classified into pale pink flesh, light yellow flesh, dark yellow flesh, and dark brown flesh. "Vegetation" can be classified into light green (verdant), dark green (greenery), and intermediate greens.

4) In the above embodiments, position data of areas defining the color range areas was used as the position data of the color range areas, but position data of pixel data defining the color range areas may also be used. In such cases, more specifically, the data can be compared with position conditions, further improving the accuracy in determining the position of the color range areas.

In the above embodiments, color range in which adjacent areas with the same color range have been associated are used to determine the main object, but the main object may be determined in terms of area units or pixel data units instead of using color range areas. When the main object is determined in terms of area units, the main object corresponding to the areas is first determined, and all areas corresponding to the same main object are then put together, permitting the formation of areas of image data GD corresponding to the main object. More specifically, position data and color range of areas which to be met by areas corresponding to certain main objects are stipulated as position conditions (object-determining conditions), and are compared with the position data and color range of the areas.

Alternatively, when the main object is determined in terms of pixel data units, the main object corresponding to the pixel data is determined first, and all the pixel data corresponding to the same main object are then put together, permitting the formation of areas of image data GD (pixel data groups) corresponding to the main object. More specifically, position data and color range of areas which to be met by pixel data corresponding to certain main objects are stipulated as position conditions (object-determining conditions), and are compared with the position data and color range of the pixel data. In such cases, the main object can be specified more accurately from the standpoint of both color range and position.

5) In the above embodiments, only the hue H was used as the parameter of the color range of areas (pixel data groups) in the image data GD, but in addition to the hue H, at least either saturation S or brightness (luminance) V may be used as a parameter for a more comprehensive determination. The color range of the image data GD areas (pixel data groups) may also be specified in terms of RGB color space or YCbCr color space instead of HSV color space.

6) In the above embodiments, a color printer 40 was used as the image processing device, but a display device 20 and personal computer 30 may also be used. In such cases, the same effects as in the above embodiments can be obtained.

7) In the above embodiments, the image process was carried out with software, that is, in the form of a computer program, but it may also be carried out using image processing hardware circuitry comprising a logic circuit for implementing the above processes (steps). In such cases, the load on the CPU 411 can be alleviated, allowing the process to be implemented more rapidly. The image process hardware circuit can be implemented as a circuit for the display device 20 and color printer 40, for example, and as an add-on card for the personal computer 30.

8) an example of the above variant 1) is described in further detail below. The example is a description of a method in which low correction target data is provided in order to prevent the main object image data from standing out from the other image data. FIG. 17 illustrates a table storing various values which are used when carrying out the picture quality adjusting process on main objects which have been classified in greater detail. Main object which have been classified in greater detail are referred to as classified main objects. The various values that are stored are "classification color values," "standard color values," and "coefficients." "Coefficients" are described below. Correction levels and low correction target data are calculated using these values. The types of classified main objects in FIG. 17 are described in Section 3).

To calculate the correction levels, the main object is classified based on the classification color values and the color values of the main object image data (Step S220 in FIG. 14), and the difference is determined between the standard color values and the color values of the main object image data. The color values of the main object image data referred to here are the average color values of each pixel in the main object image data. The average is given below as (AveH, AveS, AveV).

The saturation- and brightness-related color values and standard color values are expressed as numerical values between 0 and 100. The greater the color values and standard color values, the higher the saturation and brightness. The hue-related color values and standard color values are expressed as numerical values between 0 and 360. In the hue circle, the red hue value is 0, with the value increasing from red to yellow, to green to cyan to blue to magenta to red as the hue circle is rotated. When the cycle of the hue circle returns to red, the red hue is expressed as 360. In other words, the ed hue is expressed as 0 or 360.

When the main object is identified as "bright sky," the difference between the standard color values and the color values of the main object image data (difH, difS, difV) can be determined according to Equations (6a) through (6c) with reference to the table in FIG. 17.

$$difH = Hrefsb - AveH \qquad \text{Equation (6a)}$$

$$difS = Srefsb - AneS \qquad \text{Equation (6b)}$$

$$difV = Vrefsb - AveV \qquad \text{Equation (6c)}$$

The direction of the correction is determined by whether the difference is positive or negative. That is, when the difference in saturation, brightness, or the like is positive, the saturation, brightness, or the like is corrected in the increasing direction, whereas when the difference in saturation, brightness, or the like is negative, the saturation, brightness, or the like is corrected in the decreasing direction. When the difference in hue is positive, the hue is corrected in the direction increasing the hue value, whereas when the difference in hue is negative, the hue is corrected in the direction decreasing the hue value. The direction in which the hue value increases is the direction from yellow to cyan, the direction from cyan to magenta, or the direction from magenta to yellow in the hue circle. The direction in which the hue-related color value decreases is the direction from cyan to yellow, the direction from magenta to cyan, or the direction from yellow to magenta in the hue circle.

Preliminary correction levels are then determined by adding the "coefficient" to the determined difference. As shown in FIG. 17, there are two types of "coefficients" for the "hue," "saturation," and "brightness." When the difference (difH, difS, difV) is positive, the coefficient on the left in the parentheses is used, and when it is negative, the coefficient on the right is used. That is, the coefficient is determined according to the direction of the correction in FIG. 17. The preliminary correction level (traH, traS, traV) for "bright sky" can be determined according to Equations (7a1) to (7c2) with reference to the first line in the table in FIG. 17.

$$\text{(if difH} \geq 0) \; traH = difH \times 0 \qquad \text{Equation (7a1)}$$

$$\text{(if difH} < 0) \; traH = |difH| \times 1 \qquad \text{Equation (7a2)}$$

$$\text{(if difS} \geq 0) \; traS = difS \times 0 \qquad \text{Equation (7b1)}$$

$$\text{(if difH} < 0) \; traS = |difH| \times 1 \qquad \text{Equation (7b2)}$$

$$\text{(if difV} \geq 0) \; traV = difV \times 0 \qquad \text{Equation (7c1)}$$

$$\text{(if difV} < 0) \; traV = |difV| \times 1 \qquad \text{Equation (7c2)}$$

The correction level (enhH, enhS, enhV) is the square root of the preliminary correction level. This is so that the correction level is gradually modified. That is, the correction level can be determined by the following Equations (8a) through (8c).

$$enhH = \text{sign}(difH) \times (traH)^{1/2} \qquad \text{Equation (8a)}$$

$$enhS = \text{sign}(difS) \times (traS)^{1/2} \qquad \text{Equation (8b)}$$

$$enhV = \text{sign}(difV) \times (traV)^{1/2} \qquad \text{Equation (8c)}$$

Here, the sign (x) is a function indicating a symbol of any number x. When x>0, the sing (x) is +1. When x<0, the sign (x) is −1. When x=0, the sign (x) is 0. Here, the correction level (enhH, enhS, enhV) is the square root of the preliminary correction level, but is not limited thereto. The preliminary correction level may also be used without modification as the correction level (enhH, enhS, enhV).

The correction level (enhH, enhS, enhV) can be expressed by Equations (9a) through (9c).

$$enhH = \text{sign}(difH) \times (|difH| \times A1)^{1/2} \qquad \text{Equation (9a)}$$

$$enhS = \text{sign}(difS) \times (|difS| \times A2)^{1/2} \qquad \text{Equation (9b)}$$

$$enhV = \text{sign}(difV) \times (|difV| \times A3)^{1/2} \qquad \text{Equation (9c)}$$

Here, A1 is the hue coefficient, A2 is the saturation coefficient, and A3 is the brightness coefficient.

In the above method for calculating the correction level, the proper values can be established for coefficients A1 through A3 according to the type of classified main object and correction direction (whether the color value difference (difH, difS, difV) is positive or negative), so that the correction level can be calculated according to the type of classified main object and the direction of the correction. Here, the correction level is calculated according to the type of classified main object and correction direction, but the correction level may also be calculated according to either the type of classified main object and correction direction. When the correction level is calculated according to just the direction of correction, the main object does not have to be classified in detail, and the main object may be classified as at lest "sky," "green," or the like.

The method for calculating the correction level to either the type of classified main object and correction direction is not limited to methods using coefficients A1 through A3 as described above. In general, the correction levels may also be calculated according to computing equations which are modified according to either the type of classified main object or correction direction.

In Equations (9a) through (9c), the correction level (enhH, enhS, enhV) is determined so as to reduce or eliminate the difference (difH, difS, difV) between the standard color values and the color values of the main object image data. It will be evident that the extent to which the difference in color values is reduced can be adjusted by modifying the values of coefficients A1 through A3 (collectively referred to below as coefficients A). Coefficients A indicate the extent to which the actual color values of the main object image data are modified, and are established according to the type of classified main object and correction direction so that the main object image data will not look strange in the image as a whole.

In this embodiment, the correction level can be calculates by establishing any of 0, 1, 2, or 4 as the coefficients A. When A=0, for example, it means that there is no correction. A=1 indicates an ordinary level of correction. A=2 indicates somewhat stronger correction, and A=4 indicates strong correction.

When, based on Equation (9a), A>|dimH|, the absolute correction level |enhH| is significantly greater than the absolute difference |difH| between the standard color value and the color value of the main object image data. Thus, in the resulting correction, the color value of the main object image data is over as much as the standard color value. When the color value of the main object image data is modified too much, the main object image data in the image can look strange. It is therefore generally better to set the coefficients A too high. Here, the maximum level of the coefficients A is set at 4. The same is true of the saturation S and brightness V.

There are several reasons for setting the values for the coefficients A as in FIG. 17.

1. When the Main Object is a "Sky"

1.1 Hue

When the difH is positive, it means that the hue to be adjusted in the direction from cyan to magenta. However, when the classified main object is "bright sky," if the correction is too far in the direction from cyan to magenta, the parts where the hue is near magenta in the entire sky (such as clouds) will take on an undesirable reddish cast. Thus, when the classified main object is "bright sky," no correction is made in the direction from cyan to magenta, and the coefficients A are set at 0.

When the difH is negative, it means that the hue to be adjusted in the direction from magenta to cyan. However, when the classified main object is "bright sky," the magenta complexion is preferably left as it is. Thus, no correction is made in the direction from magenta to cyan, and the coefficients A are set at 0.

1.2 Saturation

When the difS is positive, it means that the correction to be made in the direction increasing the saturation. However, when the classified main object is "bright sky," because bright skies are relatively pale and the original saturation is high, it is possible that the saturation will be increased too much, and the saturation of the sky will be increased too much, making it look strange in the image as a whole. The saturation is therefore not increased, and the coefficients A are set at 0. When the classified main object is "bright sky," on the other hand, the original saturation is low, and the coefficients A are set to 2 in order to increase the saturation and enhance the sky.

When the difS is negative, it means that the saturation to be corrected in the decreasing direction. However, when the classified main object is "bright sky," increasing the saturation too much will result in a relatively pale sky, potentially making the image look strange and unattractive. The saturation is therefore not excessively reduced, and the coefficients A are set as 1. When the classified main object is a "dark sky," because the original saturation is low, lowering the saturation will make it deeper, potentially causing the image to look unattractive. The saturation is therefore not lowered, and the coefficients A are set at 0.

Since correction of a "bright sky" tends to make it look strange in the image as a whole, the correction level is preferably low overall, and the coefficients A are set lower. Since even significant correction levels are not likely to make a "dark sky" look strange in the image as a whole, the coefficients a may be set to higher levels.

2. When the Main Object is "Green"

2.1 Hue

When the difH is positive, it means that the hue to be adjusted in the direction from yellow to cyan. However, when the classified main object is "light green" such as a verdant green, since verdant green looks close to yellow green, an ordinary level of correction is used, and the coefficients A are set at 1. When the classified object is a "dark green" such as ordinary greenery, it tends to look close to blue green. Stronger correction is therefore used, and the coefficients A are set to 4.

2.2 Saturation

When the difS is positive, it means that the saturation to be corrected in the increasing direction. However, when the classified main object is "light green," since the original saturation of light green is high, increasing the saturation too much can result in saturation that is too high, making the object look strange in the image as a whole. The saturation is therefore not increased too much, and the coefficients A are set to 1. When, on the other hand, the classified main object is "dark green," because the original saturation is low, the coefficients A are set to 4 to increase the saturation and emphasize the green.

When the difS is negative, it means that the saturation to be adjusted in the decreasing direction. However, when the classified main object is "light green," lowering the saturation can cause the "light green" to become dark, making the image look strange and unattractive. The saturation is thus not lowered, and the coefficients A are set to 0. When the classified main object is "dark green," because the original saturation is low, lowering the saturation will potentially make it darker, causing the image to look strange. The saturation is therefore not lowered, and the coefficients A are set to 0.

As correction tends to make "light green" look strange in the image as a whole, the correction level is preferably lower overall, and the coefficients A are set lower. "Dark green" does not tend to look strange in the image as a whole even with greater correction levels, and the coefficients A may therefore be set higher.

3. When the Main Object is "Flesh"

3.1 Hue

When the difH is positive, it means that the hue to be correction in the direction from magenta to yellow. However, when the classified main object is "pale pink flesh," correction in the yellow direction can make it look bluish. No correction is therefore made, and the coefficients A are set to 0.

3.2 Saturation

When the difS is positive, it means that the saturation to be corrected in the increasing direction. However, when the classified main object is "pale pink flesh," because the original saturation is high, increasing the saturation too much can result in saturation that is too high, creating an unnatural impression by making the object stand out from the image as a whole. The saturation is therefore not increased, and the coefficients A are set to 0.

When the difS is negative, it means that the saturation to be corrected in the decreasing direction. However, when the classified main object is "dark yellow skin," because the original saturation is high, lowering the saturation too much can result in poor facial color. The saturation is therefore not lowered, and the coefficients A are set to 0. When the classified main object is "dark brown flesh," because the original saturation is low, lowering the saturation too much will result in poor facial color. The saturation is therefore not lowered, and the coefficients A are set to 0.

3.3 Brightness

When the difV is positive, it means that the brightness to be correction in the increasing direction. Because users prefer flesh to be brighter, and ordinary level of correction is used, and the coefficients A are set to 1.

When the difV is negative, it means that the brightness to be corrected in the decreasing direction. However, when the classified main object is "dark brown flesh," an ordinary level of correction is used and the coefficients A are set to 1, as this is effective for whiteout and the like.

Because correction tends to make "pale pink flesh" look strange in the image as a whole, lower correction levels overall are preferred, and the coefficients A are set lower.

The main object image data is corrected with correction levels (enhH, enhS, enhV). Low correction target data is then determined from the correction levels (enhH, enhS, enhV). Here, "low correction target data" is target data for correction at low correction levels at or under correction levels (enhH, enhS, enhV) among the image data GD. To determine low correction target data, the maximum saturation Smax and minimum saturation Smin are first determined in the main object image data. The example of saturation is used here, but brightness or hue may be processed in the same manner.

Figure 18:
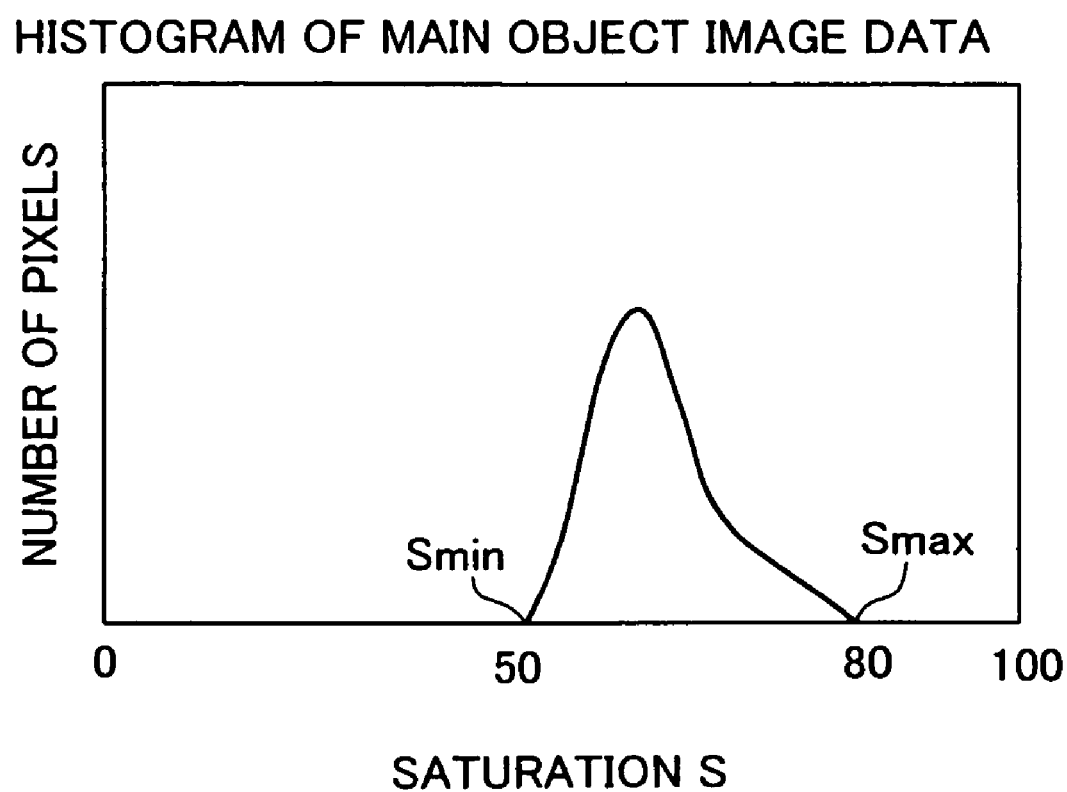
FIG. 18 is a histogram of saturation in the main object image data.

FIG. 18 is a histogram of saturation in the main object image data. Saturation is set to values of 0 to 100. In the main object image data in this embodiment, the maximum saturation Smax is 80, and the minimum is 50.

Figure 19A:
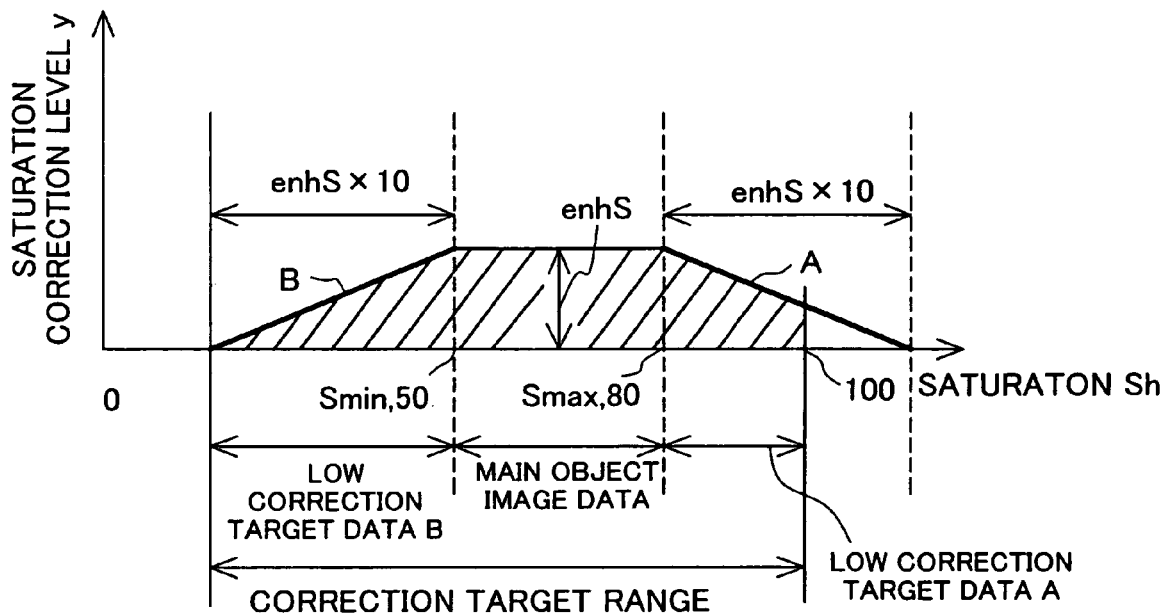
FIG. 19 illustrates low correction target data.
Figure 19B:
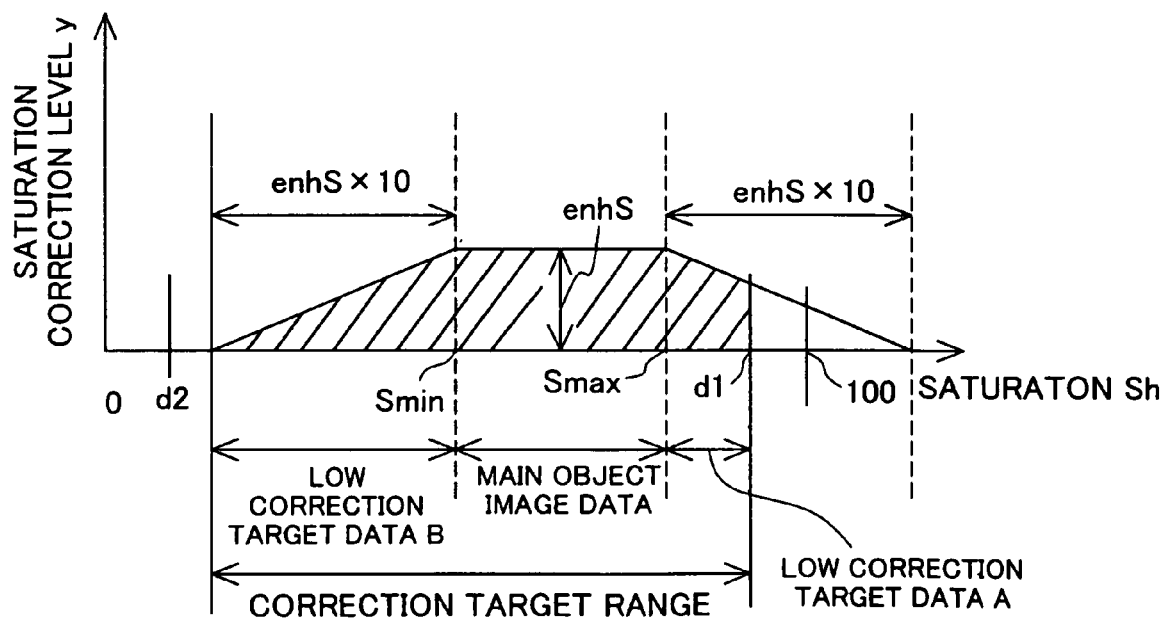

FIG. 19 illustrates low correction target data. The horizontal axis is the saturation, and the vertical axis is the saturation correction level. In FIG. 17, the range from 50 to 80 corresponds to the saturation of the main object image data, and shows that the main object image data would be corrected with correction level enhS. The saturation in the vicinity of the main object image data saturation is thus the low correction target data.

In FIG. 19(a), low correction target data A and low correction target data B are shown as low correction target data. The correction target range combining the main object image data, low correction target data A, and low correction target data B is the range data indicated by diagonal lines in FIG. 19(a).

The low correction target data A is data by which the saturation Sh is worked out with the following Inequalities (10a) and (10b) among the image data GD.

$$Smax < Sh \leq Smax + enhS \times 10 \qquad \text{Equation (10a)}$$

$$Sh \leq 100 \qquad \text{Equation (10b)}$$

The low correction target data B, on the other hand, is data by which the saturation Sh is worked out with the following Inequalities (10c) and (10d).

$$Smin - enhS \times 10 \leq Sh < Smin \qquad \text{Equation (10c)}$$

$$0 \leq Sh \qquad \text{Equation (10d)}$$

Inequalities (10b) and (10d) are established because the saturation is a value between 0 and 100. Inequalities (10a) and (10b) show that low correction target data is determined based on the maximum saturation Smax, minimum saturation Smin, and correction level enhS of the main object image data. The enhS×10 used in Inequalities (10a) and (10c) is an experimental value. Other values can also be used.

The saturation of the low correction target data is corrected with a correction level lower than correction level enhS for the main object image data (referred to below as low correction level). Specifically, as shown in FIG. 19(*a*), the low correction level for low correction target data A is established so that the correction level enhS is lowered in linear fashion as the saturation increases, and so that the low correction level is 0 for data in which the saturation is Smax+enhS×10. That is, Equation (11) shows the low correction level y1 for the saturation of the low correction target data A.

$$y1=-Sh/10+enhS+Smax/10 \quad \text{Equation (11)}$$

Meanwhile, the low correction level for the low correction target data B, as shown by the bold line B in FIG. 19(*a*), is established so that the correction level enhS is lowered in linear fashion as the saturation decreases, and so that the low correction level is 0 for data in which the saturation is Smin−enhS×10. That is, Equation (12) shows the low correction level y2 for the saturation of the low correction target data B.

$$y2=-Sh/10+enhS-Smin/10 \quad \text{Equation (12)}$$

The corrected value z1 of the saturation of the low correction target data A is the value obtained by adding the low correction level y1 to the uncorrected saturation Sh, that is, Sh+y1, which can be expressed by Equation (13).

$$z1=9Sh/10+enhS+Smax/10 \quad \text{Equation (13)}$$

The corrected saturation z to be no more than 100, which is the maximum obtainable saturation. FIG. 19(*b*) illustrates an example in which the low correction target data range is adjusted so that the correction saturation is between 0 and 100. The low correction target data A is data by which the saturation Sh is worked out with the following Inequality (14).

$$Sh \leq (100-enhS-Smax/10) \times 10/9 \quad \text{Inequality (14)}$$

The saturation d1 in FIG. 19(*b*) has the value (100−enhS−Smax/10)×10/9 in Inequality (14).

Similarly, the corrected saturation z2 for the low correction target data B is Sh+y2, and can thus be expressed by Equation (15).

$$z2=11Sh/10+enhS-Smin/10 \quad \text{Equation (15)}$$

To produce a range in which the correction value z2 is at least 0, the saturation Sh of the low correction target data B to be data with a range worked out with the following Inequality (16).

$$Sh \geq (-enhS+Smin/10) \times 10/11 \quad \text{Inequality (16)}$$

The saturation d2 in FIG. 19(*b*) is the value of (−enhS+Smikn/10)×10 in Inequality (16). In this embodiment, because d2 is lower than (Smin−enhS×10), the low correction target data B determined from Inequalities (10c), (10d), and (16) results in the data with the range shown in FIG. 19(*b*).

However, correction for increasing the saturation of image data having low saturation among the graphic GD can result in excessively high saturation in nearly achromatic data in the image data GD. The image data with low saturation should therefore be excluded from the low correction target data B to facilitate the connection with achromatic colors. A minimum low saturation level is D may thus be established in the correction target data range.

Figure 20:
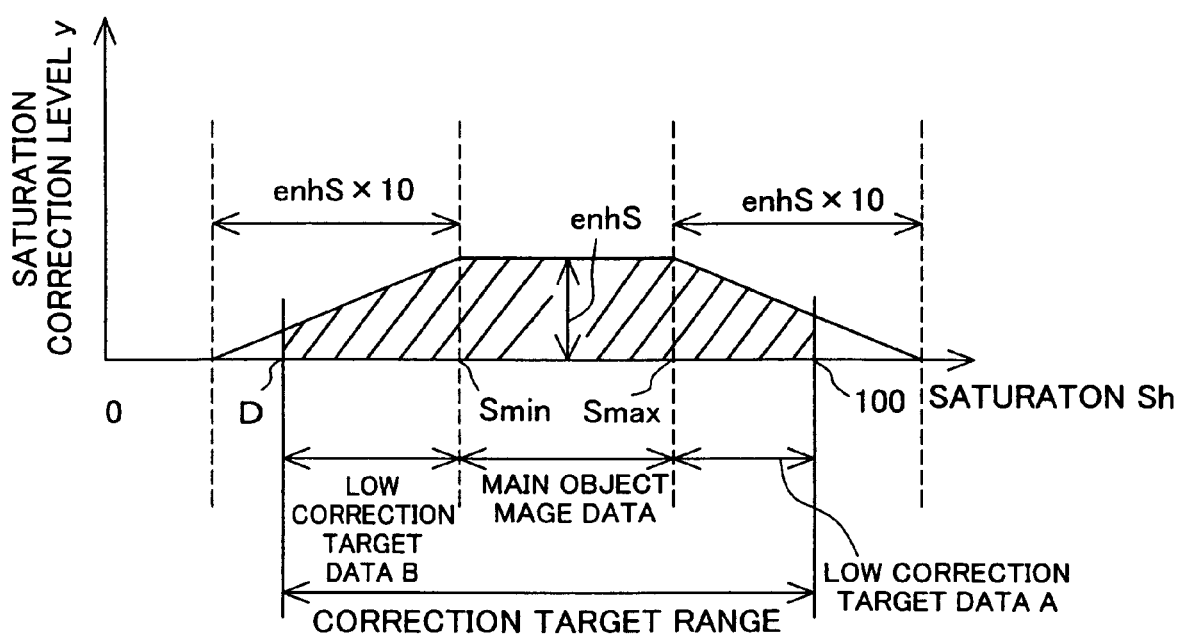
FIG. 20 illustrates the minimum level D for low correction target data B.

FIG. 20 illustrates the minimum level D for the low correction target data B. The minimum level D may be 25, for example, or another value. The low correction target data B is limited to the range where the saturation Sh is worked out with the following Inequality (17).

$$D \leq Sh \quad \text{Inequality (17)}$$

The low correction target data B determined from Inequalities (10c) and (17) is data with the range shown in FIG. 20.

The minimum level d to be established only when enhS>0, that is, when the correction increases the saturation.

The low correction level may be determined so as to be applicable to limited low correction target data after the low correction target data range has been limited by means of Inequalities (10b) and (10d) or Inequality (17). FIG. 21 illustrates a low correction level suitable for limited low correction target data. When limited by Inequality (10b), the low correction level of the low correction target data A is set so that the low correction level for data with a saturation of 100 will be 0, as illustrated by the bold line A in FIG. 21. When limited by Inequality (17), the low correction level of the low correction target data B is set so that the low correction level for data with a saturation D is 0, as illustrated by the bold line B in FIG. 21.

Low correction target data and low correction levels are determined, and correction target ranges are determined, in the same way for hue and brightness. A minimum level D for brightness may also be set in the same was as for saturation. This will prevent corrected parts of an image from looking strange as a result of excessively increased brightness in shadow areas hen determining the low correction target data B. Here, the image data which is to serve as the low correction target data is the low correction target data targeted for correction for saturation, hue, and brightness. However, the image data which is low correction target data with any of saturation, hue, or brightness may also be used as the low correction target data targeted for correction.

FIG. 22 illustrates the correction target range in the image data GD. In the image data GD of FIG. 22, the area S1 corresponds to the main object image data. When low correction target data is included in area 01, area 02, and area 03, the correction target range is the low correction target data in areas S1 and areas 01, 02, and 03. In FIG. 20, the correction target range is in the frame indicated by the bold line. The picture quality of the image data GD is adjusted by applying the determined correction levels (enhH, enhS, enhV) to the main object image data and applying the low correction levels to the low correction target data.

Thus, in this embodiment, the low correction target data other than the main object image data is corrected with low correction levels, thereby preventing the main object image data from standing out from the other image data while also enhancing the image as a whole.

The low correction level may also be lower than the correction level enhS for the main object image data. The correction level enhS may also be lowered in stages, without being limited to the linear reduction described above.

The low correction target data is not limited to being present in areas adjacent to the main object image data, as illustrated in FIG. 22, and can also be present in areas apart from the main object image data, such as area S2.

In the above embodiment, the low correction target data was data other than the main object image data, but is not limited thereto. Low correction target data may also be included in at least part of the main object image data. That is, the correction level may be reduced for some of the main object image data to prevent the main object image data from standing out from the other image data.

Figures 23, 24:
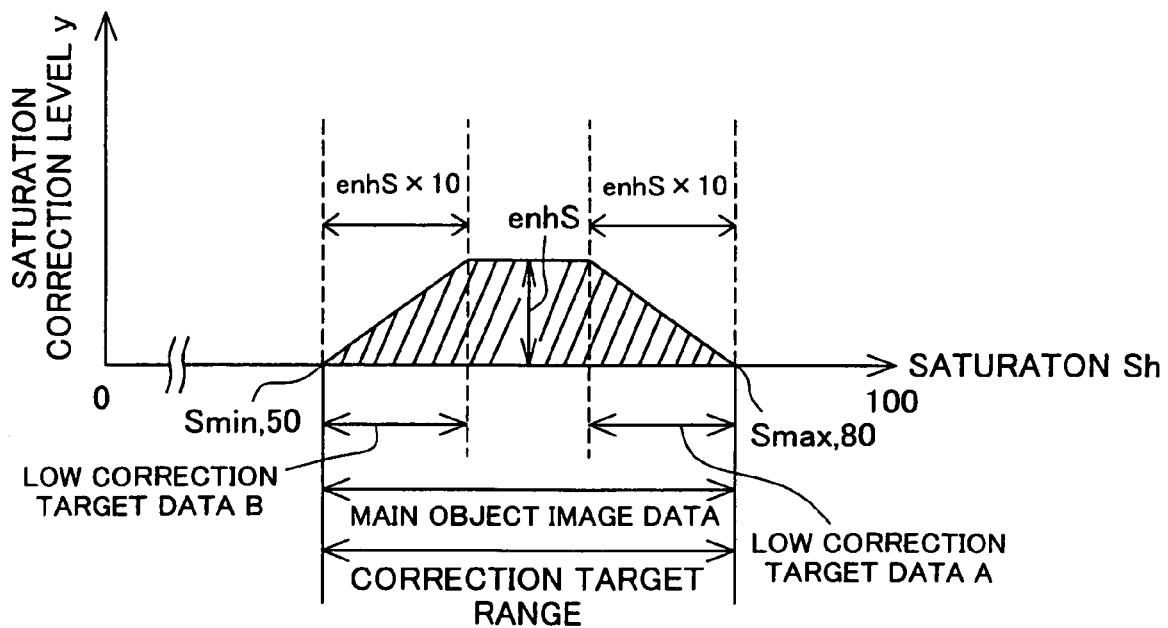
FIG. 23 illustrates an example in which all of the low correction target data is included in the main object image data.
FIG. 24 illustrates the correction target range when all of the low correction target data is included in the main object image data.

FIG. 23 illustrates an example in which all of the low correction target data is included in the main object image data. Data with a saturation Sh worked out by the following Inequality (18a) among the main object image data is low correction target data A, and data with saturation Sh worked out by the following Inequality (18b) is low correction target data B.

$$S\max - enhS \times 10 < Sh \leq S\max \quad \text{Inequality (18a)}$$

$$S\min \leq Sh < S\min + enhS \times 10 \quad \text{Inequality (18b)}$$

In this case, the low correction target data A and B are included in the main object image data, and the correction target range is consistent with the main object image data.

FIG. 24 illustrates the correction target range when all of the low correction target data is included in the main object image data. The frame indicated by the bold line is the correction target range. In area S1 which corresponds to the main object image data, the area indicated by diagonal lines in the figure is an area including the low correction target data which is to be corrected with a low correction level.

The correction process in which low correction target data has been established, as described with reference to FIGS. 18 through 24 above, is applicable when the main object has not been classified in detail, that is, for main objects other than classified main objects.

The correction process described in the other embodiment 8) to be carried out after correction such as the tone curve correction described above. The above correction processes may also be carried out in color space other than HSV color space, such as RGB color space.

9) In the above embodiments, the main object image data was determined by analysis of the image, but in cases where data indicating the main object image data (such as position data) is included in auxiliary data of the image data, the main object image data may be determined on the basis of such auxiliary data.

Image processing devices, image processing methods, and image processing programs of the invention have been described based on the above embodiments, but these embodiments of the invention were intended to facilitate an understanding of the invention and do not limit the invention. The invention can be modified and improved without departing from the spirit and scope of the invention, and such equivalents are included in the invention.

The following Japanese patent applications serving as the basis of the priority right claimed in this application are incorporated hereby by reference.

(1) Japanese Patent Application 2004-63630 (filed on Mar. 8, 2004)

(2) Japanese Patent Application 2004-63637 (filed on Mar. 8, 2004)

(3) Japanese Patent Application 2004-182016 (filed on Jun. 21, 2004)

(4) Japanese Patent Application 2005-38009 (filed on Feb. 15, 2005)

What is claimed is:

1. A method of image processing, the method comprising:
   determining a main object in an image generated by an image generating apparatus, wherein the main object includes at least a human face, and wherein the determining of the main object is implemented by determining whether the image includes the human face;
   acquiring properties of the determined main object;
   acquiring correction conditions corresponding to the acquired properties; and
   adjusting image quality of the main object using the acquired correction conditions, wherein a parameter used in adjusting the image quality is a highlight, a shadow, brightness, contrast, color balance, or memory color, and
   wherein each operation of the method of image processing is executed by one of a personal computer, a printer, or a display device.

2. The method in accordance with claim 1, wherein the correction conditions are different when the main object is determined as a night time scene and a human face and when the main object is determined as a human face.

3. A method of image processing, the method comprising:
   determining a main object in an image generated by an image generating apparatus, wherein the main object includes at least a human face, and wherein the determining of the main object is implemented by determining whether the image includes the human face; and
   adjusting image quality of the main object using correction conditions corresponding to properties of the determined main object, wherein a parameter used in adjusting the image quality is a highlight, a shadow, brightness, contrast, color balance, or memory color, and
   wherein each operation of the method of image processing is executed by one of a personal computer, a printer, or a display device.

4. The method in accordance with claim 3, wherein the correction conditions are different when the main object is determined as a night time scene and a human face and when the main object is determined as a human face.

5. An image processing apparatus comprising:
   one or more processors;
   memory;
   a determining module configured to determine a main object in an image generated by an image generating apparatus, wherein the main object includes at least a human face, and wherein the determining module determines whether the image includes the human face;
   a property acquirer configured to acquire properties of the determined main object;
   a correction condition acquirer configured to acquire correction conditions corresponding to the acquired properties; and
   an image quality adjuster configured to adjust image quality of the main object using the acquired correction conditions, wherein a parameter used by the image quality adjuster to adjust image quality is a highlight, a shadow, brightness, contrast, color balance, or memory color, and
   wherein the image processing apparatus is either a personal computer or a printer or a display device.

6. The image processing apparatus in accordance with claim 5, wherein the correction conditions are different when the main object is determined as a night time scene and a human face and when the main object is determined as a human face.

7. An image processing apparatus comprising:
   one or more processors;
   memory;
   a determining module configured to determine a main object in an image generated by an image generating apparatus, wherein the main object includes at least a human face, and wherein the determining module determines whether the image includes the human face; and
   an image quality adjuster configured to adjust image quality of the main object using correction conditions corresponding to properties of the determined main object, wherein a parameter used by the image quality adjuster to adjust image quality is a highlight, a shadow, brightness, contrast, color balance, or memory color, and
   wherein the image processing apparatus is either a personal computer or a printer or a display device.

8. The image processing apparatus in accordance with claim 7, wherein the correction conditions are different when the main object is determined as a night time scene and a human face and when the main object is determined as a human face.

9. A computer program product for image processing comprising:
   a non-transitory computer readable medium storing computer readable code therein for execution by either a personal computer or a printer or a display device, the computer readable code comprising:
   computer readable code for determining a main object in an image generated by an image generating apparatus, wherein the main object includes at least a human face, and wherein the determining of the main object is implemented by determining whether the image includes the human face;
   computer readable code for acquiring properties of the determined main object;
   computer readable code for acquiring correction conditions corresponding to the acquired properties; and
   computer readable code for adjusting image quality of the main object using the acquired correction conditions, wherein a parameter used in adjusting the image quality is a highlight, a shadow, brightness, contrast, color balance, or memory color.

10. The computer program product in accordance with claim 9, wherein the correction conditions are different when the main object is determined as a night time scene and a human face and when the main object is determined as a human face.

11. A computer program product for image processing comprising:
   a non-transitory computer readable medium storing computer readable code therein for execution by either a personal computer or a printer or a display device, the computer readable code comprising:
   computer readable code for determining a main object in an image generated by an image generating apparatus, wherein the main object includes at least a human face, and wherein the determining of the main object is implemented by determining whether the image includes the human face; and
   computer readable code for adjusting image quality of the main object using correction conditions corresponding to properties of the determined main object, wherein a parameter used in adjusting the image quality is a highlight, a shadow, brightness, contrast, color balance, or memory color.

12. The computer program product in accordance with claim 11, wherein the correction conditions are different when the main object is determined as a night time scene and a human face and when the main object is determined as a human face.

* * * * *